US009291765B2

(12) United States Patent
Kim et al.

(10) Patent No.: US 9,291,765 B2
(45) Date of Patent: Mar. 22, 2016

(54) BACKLIGHT UNIT AND DISPLAY APPARATUS HAVING THE SAME

(71) Applicant: SAMSUNG DISPLAY CO., LTD., Yongin, Gyeonggi-Do (KR)

(72) Inventors: Hyoung-Joo Kim, Anyang-Si (KR); Sangwoo Ha, Yongin-Si (KR); Jieun Nam, Seoul (KR); Tae Yong Ryu, Hwaseong-Si (KR); Jinsung Choi, Cheonan-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 256 days.

(21) Appl. No.: 13/755,327

(22) Filed: Jan. 31, 2013

(65) Prior Publication Data

US 2014/0036531 A1 Feb. 6, 2014

(30) Foreign Application Priority Data

Aug. 3, 2012 (KR) ........................ 10-2012-0085384

(51) Int. Cl.
*G02B 6/26* (2006.01)
*F21V 8/00* (2006.01)

(52) U.S. Cl.
CPC ............ *G02B 6/0033* (2013.01); *G02B 6/0028* (2013.01); *G02B 6/0036* (2013.01); *G02B 6/0038* (2013.01)

(58) Field of Classification Search
CPC .... G02B 6/005; G02B 6/0038; G02B 6/0058; G02B 6/0036
USPC .................. 362/607, 615, 619, 625, 330, 620
See application file for complete search history.

(56) References Cited

U.S. PATENT DOCUMENTS

| | | | | |
|---|---|---|---|---|
| 5,854,872 A * | 12/1998 | Tai | ................................. | 385/133 |
| 6,921,178 B2 * | 7/2005 | Ohkawa | ........................ | 362/620 |
| 7,128,459 B2 * | 10/2006 | Igarashi et al. | ............... | 362/621 |
| 7,287,892 B1 * | 10/2007 | Pang et al. | .................... | 362/604 |
| 7,393,130 B2 * | 7/2008 | Hasei | ............................ | 362/619 |
| 7,431,491 B2 * | 10/2008 | Liao | ................................ | 362/620 |
| 7,547,129 B2 * | 6/2009 | Uehara et al. | ................. | 362/607 |
| 7,632,003 B2 * | 12/2009 | Noh et al. | ..................... | 362/620 |

(Continued)

FOREIGN PATENT DOCUMENTS

| | | | | |
|---|---|---|---|---|
| JP | 2003-121840 | | 4/2003 | |
| JP | 2005-063913 | * | 3/2005 | ............... G02B 6/00 |

(Continued)

OTHER PUBLICATIONS

English Abstract for Publication No. 10-2004-0049202 (FOR 10-0756368).

(Continued)

*Primary Examiner* — Peggy Neils
(74) *Attorney, Agent, or Firm* — F. Chau & Associates, LLC

(57) ABSTRACT

A backlight unit includes a light source that emits light and a light guide plate disposed adjacent to the light source. The light guide plate includes an incident surface to which light is incident, an exit surface from which light incident through the incident surface exits, a reflection surface facing the exit surface to reflect the incident light, and a plurality of lenticular protrusions disposed on the exit surface. The reflection surface includes an inclined surface proximal to the incident surface and inclined with respect to the exit surface.

29 Claims, 21 Drawing Sheets

(56) References Cited

U.S. PATENT DOCUMENTS

| | | | |
|---|---|---|---|
| 7,815,357 B2 * | 10/2010 | Hayashi et al. | 362/606 |
| 8,434,923 B2 * | 5/2013 | Huang | 362/612 |
| 8,605,233 B2 * | 12/2013 | Lee et al. | 349/65 |
| 8,740,439 B2 * | 6/2014 | Holman et al. | 362/609 |
| 8,920,014 B2 * | 12/2014 | Baek et al. | 362/602 |
| 2002/0172039 A1 | 11/2002 | Inditsky | |
| 2008/0043171 A1 | 2/2008 | Takahashi et al. | |
| 2008/0170174 A1 | 7/2008 | Nishiyama | |
| 2009/0316077 A1 * | 12/2009 | Li et al. | 349/65 |
| 2011/0013418 A1 * | 1/2011 | Kanade et al. | 362/606 |
| 2011/0147397 A1 | 6/2011 | Oster et al. | |

FOREIGN PATENT DOCUMENTS

| | | |
|---|---|---|
| JP | 2006-133274 | 5/2006 |
| JP | 2006-154320 | 6/2006 |
| JP | 2008-134391 | 6/2008 |
| JP | 2011-146176 | 7/2011 |
| KR | 10-2005-0030723 | 3/2005 |
| KR | 10-2005-0049196 | 5/2005 |
| KR | 10-2006-0132202 | 12/2006 |
| KR | 10-0756368 | 8/2007 |
| KR | 10-2008-0060736 | 7/2008 |
| KR | 10-2009-0054722 | 6/2009 |
| KR | 10-2011-0000698 | 1/2011 |

OTHER PUBLICATIONS

English Abstract for Publication No. 10-2005-0030723.
English Abstract for Publication No. 10-2005-0049196.
English Abstract for Publication No. 10-2006-0132202.
English Abstract for Publication No. 10-2008-0060736.
English Abstract for Publication No. 10-2009-0054722.
English Abstract for Publication No. 10-2011-0000698.
English Abstract for Publication No. 2003-121840.
English Abstract for Publication No. 2006-133274.
English Abstract for Publication No. 2006-154320.
English Abstract for Publication No. 2008-134391.
English Abstract for Publication No. 2011-146176.

* cited by examiner

BACKLIGHT UNIT AND DISPLAY APPARATUS HAVING THE SAME

CROSS-REFERENCE TO RELATED APPLICATION

This U.S. non-provisional patent application claims priority under 35 U.S.C. §119 from Korean Patent Application No. 10-2012-0085384, filed on Aug. 3, 2012 in the Korean Intellectual Property Office, the contents of which are herein incorporated by reference in their entirety.

BACKGROUND

1. Field of Disclosure

Embodiments of the present disclosure are directed to a backlight unit and a display apparatus. More particularly, embodiments of the present disclosure are directed to a backlight unit capable of reducing a total thickness thereof and a display apparatus having the backlight unit.

2. Discussion of the Related Art

In general, a flat panel display apparatus includes a display panel that displays an image, a backlight unit that provides light to the display panel, and a bottom chassis that accommodates the backlight unit.

A backlight unit may be classified as an edge-illumination type backlight unit or a direct-illumination type backlight unit. An edge-illumination type backlight unit is thinner than a direct-illumination type backlight unit. Accordingly, a mobile display unit generally employs an edge-illumination type backlight unit.

SUMMARY

Embodiments of the present disclosure provide a backlight unit capable of reducing a total thickness thereof.

Embodiments of the present disclosure provide a display apparatus having the backlight unit.

Embodiments of the inventive concept provide a backlight unit that includes a light source that emits light and a light guide plate disposed adjacent to the light source. The light guide plate includes an incident surface to which light is incident, an exit surface from which light incident through the incident surface exits, a reflection surface facing the exit surface to reflect incident light, and a plurality of lenticular protrusions disposed on the exit surface. The reflection surface includes an inclined surface proximal to the incident surface and inclined with respect to the exit surface.

Embodiments of the inventive concept provide a display apparatus that includes a display unit that displays an image, a backlight unit that provides light to the display unit, and a receiving container that accommodates the backlight unit.

The backlight unit includes a light source that emits light and a light guide plate disposed adjacent to the light source. The light guide plate includes an incident surface to which light is incident, an exit surface from which light incident through the incident surface exits, a reflection surface facing the exit surface to reflect incident light, and a plurality of lenticular protrusions disposed on the exit surface. The reflection surface includes an inclined surface proximal to the incident surface and inclined with respect to the exit surface.

Further embodiments of the inventive concept provide a backlight unit that includes a light guide plate that includes a first incident surface onto which light is incident, an exit surface from which light incident through the first incident surface exits, and a reflection surface facing the exit surface to reflect incident light. The exit surface includes a first area adjacent to the first incident surface and a second area adjacent to the first area upon which a plurality of lenticular protrusions are disposed that extend in a first direction perpendicular to a longitudinal direction of the first incident surface. The second area comprises a first lenticular area in which each lenticular protrusion has a semi-circular conical shape and a second lenticular area in which each lenticular protrusion has a semi-circular cylindrical shape.

According to the above, the reflection surface of the light guide plate includes the inclined surface disposed proximal to the incident surface and inclined with respect to the exit surface, and thus the area of the light guide plate to which light is incident may be increased and a total thickness of the display apparatus may be reduced.

In addition, the plurality of lenticular protrusions disposed on the exit surface of the light guide plate may prevent light incident to the light guide plate from leaking through the side surfaces of the light guide plate. Accordingly, the light efficiency of the backlight unit may be improved.

Further, the height and the diameter of the plurality of lenticular protrusions linearly increase with increasing distance from the incident surface, thereby preventing light leakage in the light incident area.

DESCRIPTION OF THE EMBODIMENTS

It will be understood that when an element or layer is referred to as being "on", "connected to" or "coupled to" another element or layer, it can be directly on, connected or coupled to the other element or layer or intervening elements or layers may be present. Like numbers may refer to like elements throughout.

Hereinafter, exemplary embodiments of the present disclosure will be explained in detail with reference to the accompanying drawings. However, the present disclosure is not limited to the following embodiments but can include various changes, substitutions and/or modifications within the technical scope of the present disclosure.

Figure 1:
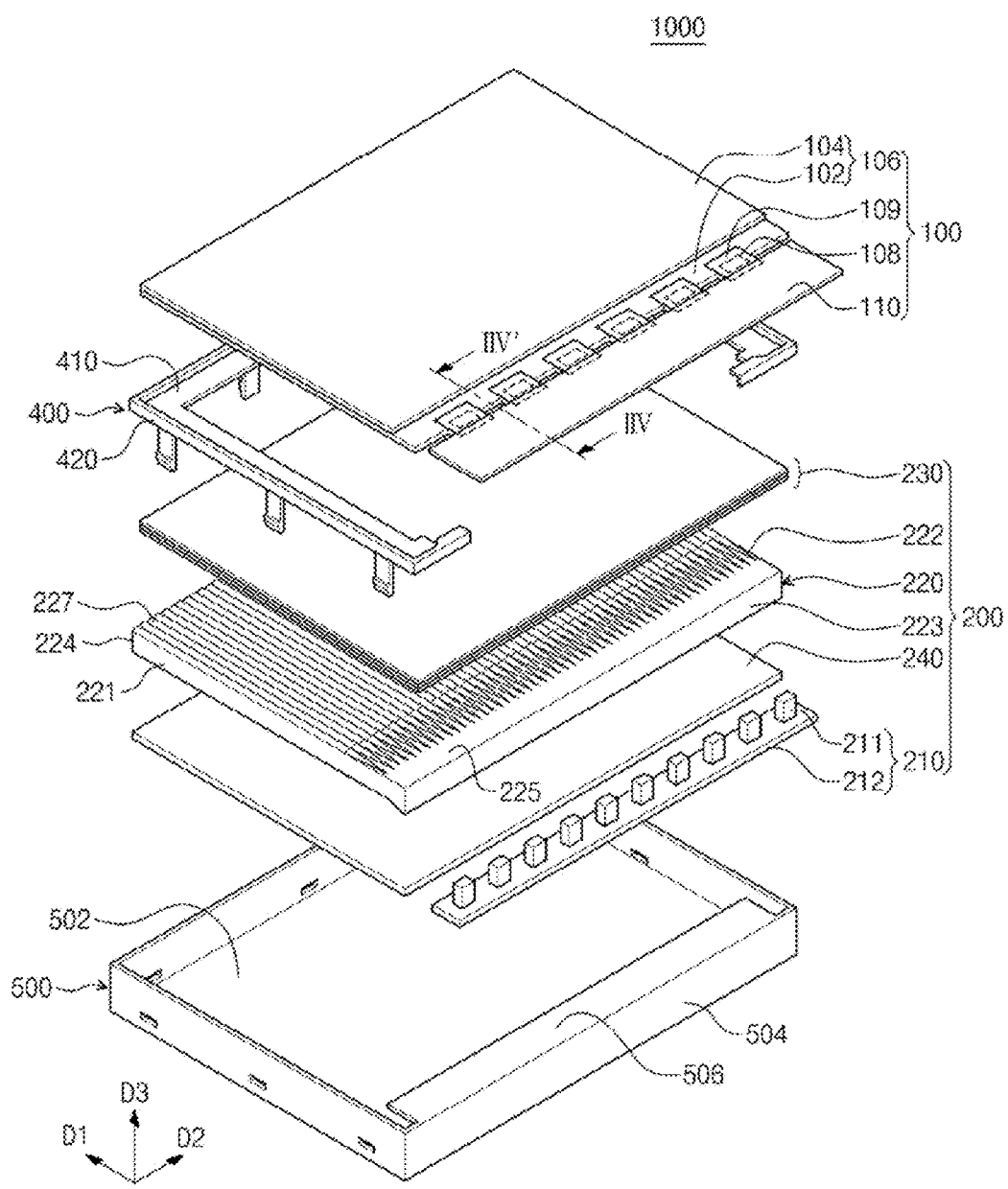
FIG. 1 is an exploded perspective view of a display apparatus according to an exemplary embodiment of the present disclosure.

FIG. 1 is an exploded perspective view of a display apparatus according to an exemplary embodiment of the present disclosure.

Referring to FIG. 1, a display apparatus 1000 includes a display unit 100, a backlight unit 200, a mold frame 400, and a bottom chassis 500.

When viewed in a plan view, the display apparatus 1000 has a rectangular shape with short sides and long sides. A direction of the short sides is referred to as a first direction D1 and a direction of the long sides is referred to as a second direction D2. The second direction D2 is substantially perpendicular to the first direction D1. In addition, the bottom chassis 500, the backlight unit 200, the mold frame 400, and the display unit 100 sequentially stacked along a third vertical direction D3 substantially normal to the plane of the first and second directions D1 and D2.

The display unit 100 includes a display panel 106 displaying an image, one or more driver chips 108 applying a driving signal to the display panel 106, and a printed circuit board 110 electrically connected to the display panel 106.

The display panel 106 includes a first substrate 102, a second substrate 104 coupled to the first substrate 102 to face the first substrate 102, and a liquid crystal layer (not shown) interposed between the first substrate 102 and the second substrate 104. For example, FIG. 1 shows a liquid crystal display panel as the display panel 106, but the display panel 106 is not limited to a liquid crystal display panel.

The first substrate 102 includes a plurality of pixels arranged in a matrix form, and each pixel includes a gate line (not shown) extending in one direction, a data line (not shown) extending in the other direction and insulated from the gate line while crossing the gate line, and a pixel electrode (not shown). In addition, each pixel includes a thin film transistor (not shown) connected to the gate line, the data line, and the pixel electrode.

The second substrate 104 includes red, green, and blue color pixels (not shown) and a common electrode facing the pixel electrode. Alternatively, the color pixels and the common electrode may be disposed on the first substrate 102 instead of the second substrate 104. The liquid crystal layer includes liquid crystal molecules arranged according to an intensity of an electric field formed between the pixel electrode and the common electrode that control transmittance of light passing therethrough from the backlight unit 200, thereby displaying desired images.

When viewed in a plan view, the driver chips 108 are connected to at least one side of the first substrate 102 to apply a data signal to the data line. The driver chips 108 generate the data signal to be applied to the data line of the display panel 106 in response to an external signal. The external signal is provided from the printed circuit board 110 and includes various signals, e.g., image signal, control signals, driving voltages, etc.

The first substrate 102 includes a gate driving circuit provided on a side thereof different from the side of the driver chips 108 to apply a gate signal to the gate line. The gate driving circuit may be formed by a thin film deposition process used to form the display panel 106. Accordingly, the gate driving circuit may be embedded in the display panel.

As another exemplary embodiment, the driver chips 108 may be configured to include a data driver chip and a gate driver chip and may be mounted on the first substrate 102 by a chip on glass process.

The printed circuit board 110 is electrically connected to the display panel 106 by a plurality of tape carrier packages (TCPs) 109. One driver chip 108 is mounted on each TCPs 109. The TCPs 109 are bent to surround the side surface of the bottom chassis 500.

The printed circuit board 110 may be disposed under the bottom chassis 500. In this case, the display apparatus 1000 may further include a shield case (not shown) disposed under the bottom chassis 500 to protect the printed circuit board 110. Although not shown in FIG. 1, the printed circuit board 110 may be disposed on a sidewall of the bottom chassis 500.

The backlight unit 200 includes a light source part 210 that generates light and a light guide plate 220 that guides the light emitted by the light source part 210 to the display unit 100.

In a present exemplary embodiment, the backlight unit 200 may be, but is not limited to, an edge-illumination type backlight unit. The light source part 210 of the backlight unit 200 is disposed under the backlight unit 200 and provides light to at least one side surface of the light guide plate 220, and the light guide plate 220 guides the light to the display unit 100.

The light guide plate 220 includes a first side surface 221 extending in the first direction D1, a second side surface 222 substantially parallel to the first side surface 221, a third side surface 223 extending in the second direction D2, and a fourth side surface 224 substantially parallel to the third side surface 223. In a present exemplary embodiment, the light source part 210 may be located adjacent to the third side surface 223 of the light guide plate 220 to extend in the second direction D2. Thus, hereinafter, the third side surface 223 will be referred to as an incident surface of the light guide plate 220.

The light source part 210 includes a plurality of light emitting diodes 211 sequentially arranged along the incident surface 223. The light source part 210 further includes a support film 212 on which the light emitting diodes 211 are mounted. The light emitting diodes 211 are disposed on the support film 212 and spaced apart from each other in the second direction D2.

The backlight unit 200 further includes a plurality of optical sheets 230 disposed between the light guide plate 220 and the display unit 100 and a reflection plate 240 disposed under the light guide plate 220.

The optical sheets 230 includes a diffusion sheet that diffuses the light and at least one light condensing sheet that condenses the light to improve brightness and a viewing angle of the light exiting from the light guide plate 220. Although not shown in FIG. 1, the optical sheets 230 may further include a protective sheet disposed as an uppermost sheet of the optical sheets 230. The reflection plate 240 is disposed under the light guide plate 220 and reflects light leaking from the light guide plate 220 to be incident to the light guide plate 220.

The bottom chassis 500 includes a bottom portion 502 on which the backlight unit 200 is mounted, a sidewall 504 extending upward from the bottom portion 502 in the third direction D3, and a cover portion 506 extending inward from the sidewall 504 in a direction substantially parallel to the bottom portion 502 to cover the light source part 210.

The mold frame 400 is disposed between the display unit 100 and the backlight unit 200 to support the display panel 106. The mold frame 400 includes a support portion 410 that supports the display panel 106 and a sidewall 420 extending from the support portion 410 in the third direction D3. As shown in FIG. 1, a portion of the support portion 410 adjacent to the light source part 210, and portions of the sidewall 420 are removed to expose the cover portion 506 of the bottom chassis 500. Accordingly, a portion of the display panel 106 is mounted on the cover portion 506 in an area, hereinafter referred to as the light incident area, adjacent to the light source part 210.

A double-sided adhesive tape (not shown) may be disposed between the display panel 106 and the cover portion 506. Thus, the display panel 106 may be fixed to the cover portion 506 by the double-sided adhesive tape.

In addition, a fixing tape (not shown) may be further attached to an edge of the display panel 106 to fix the display panel 106 to the mold frame 400.

Although not shown in FIG. 1, the display apparatus 1000 may further include a top chassis (not shown) coupled to the bottom chassis 500 to face each other and cover an edge of the display panel 106.

Figure 2:
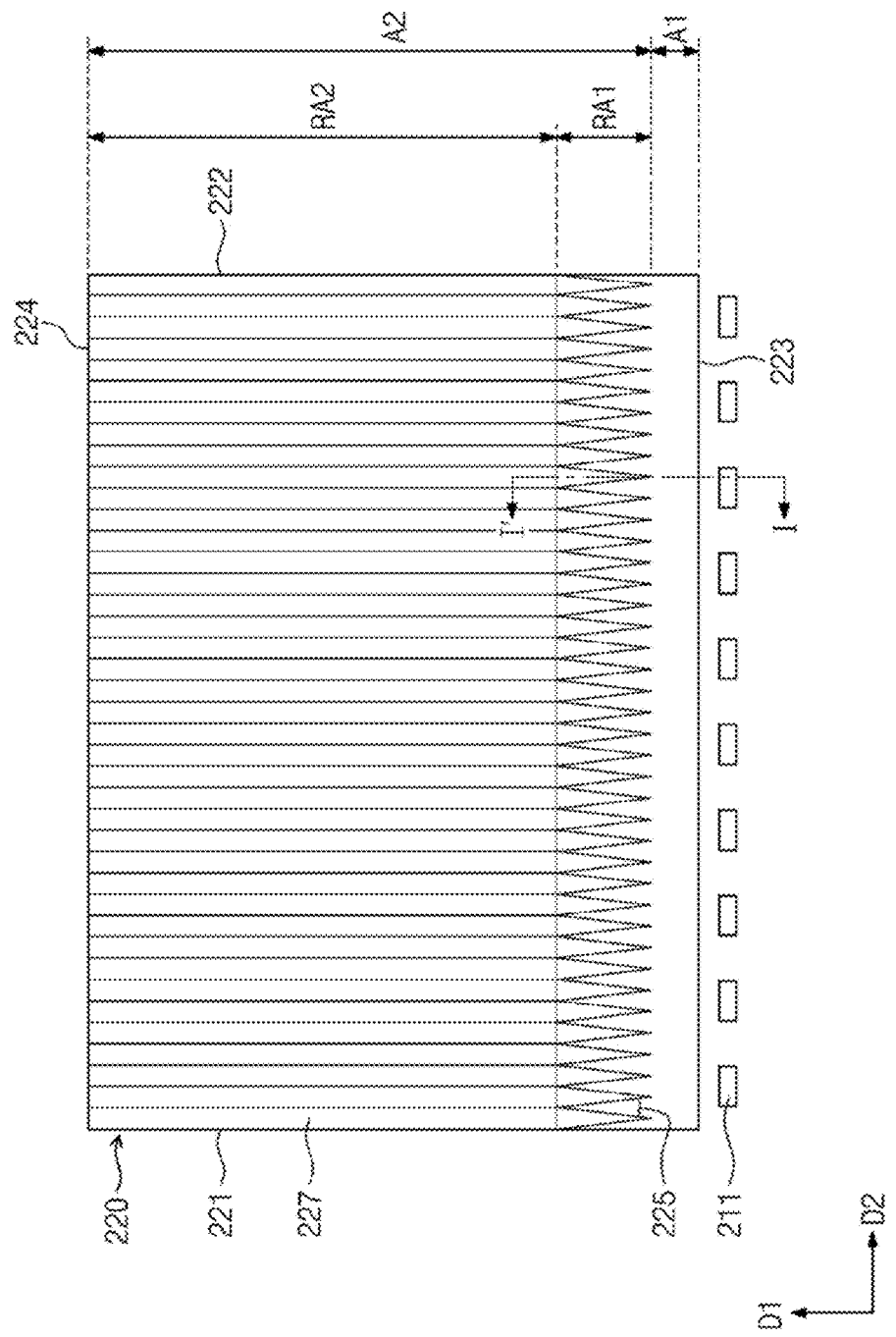
FIG. 2 is a plan view of a light guide plate and a light emitting diode shown in FIG. 1.
Figure 3:
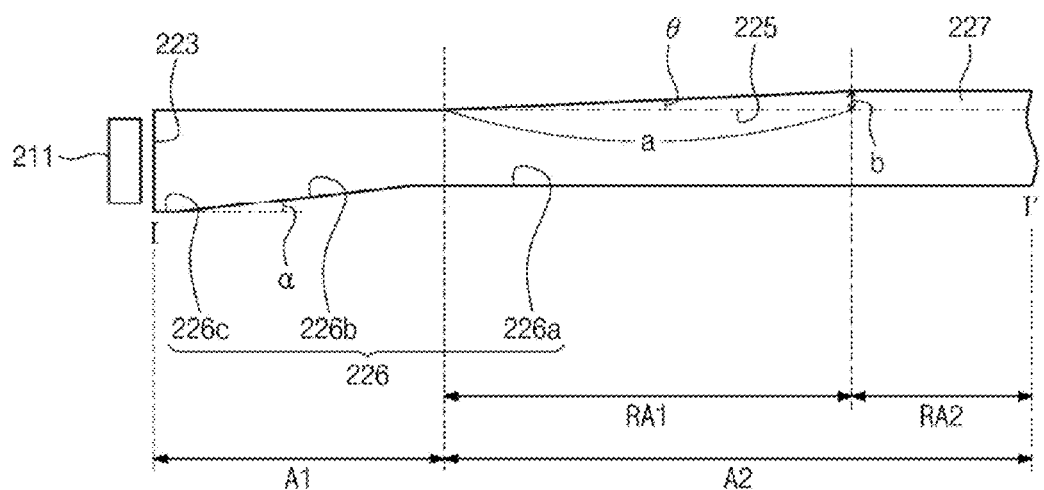
FIG. 3 is a cross-sectional view taken along a line I-I' shown in FIG. 2.

FIG. 2 is a plan view of a light guide plate and the light emitting diodes shown in FIG. 1 and FIG. 3 is a cross-sectional view taken along a line I-I' shown in FIG. 2.

Referring to FIGS. 2 and 3, the light guide plate 220 includes the first side surface 221 extending in the first direction D1 of the display apparatus 1000, the second side surface 222 substantially parallel to the first side surface 221, the third side surface 223 extending in the second direction D2 of the display apparatus 1000, and the fourth side surface 224 substantially parallel to the third side surface 223.

For example, the light emitting diodes 211 are located adjacent to the third side surface 223, i.e., the incident surface, of the light guide plate 220. The light emitting diodes 211 emit light and the light guide plate 220 receives the light through the third side surface 223 thereof. That is, the third side surface 223 serves as the incident surface and the fourth side surface 224 substantially parallel to the third side surface 223 serves as an opposite surface.

The light guide plate 220 further includes an exit surface 225 from which the light incident through the incident surface 223 is emitted and a reflection surface 226 facing the exit surface to reflect the incident light.

The reflection surface 226 includes a first flat surface 226a substantially parallel to the exit surface 225, an inclined surface 226b proximal to the incident surface 223 that extends from the first flat surface 226a toward the incident surface 223 and is inclined with respect to the exit surface 225, and a second flat surface 226c connecting the inclined surface 226b and the incident surface 223. The inclination of the inclined surface 226b is such that a distance of the inclined surface 226b from the exit surface 225 increases as the inclined surface 226b comes closer to the incident surface 223. The second flat surface 226c is disposed between the inclined surface 226b and the incident surface 223 and is substantially parallel to the exit surface 225.

An angle $\alpha$, at which the inclined surface 226b is inclined with respect to the second flat surface 226c, hereinafter referred to as the inclination angle, is in a range of about 2 degrees to about 5 degrees. As the inclination angle $\alpha$ of the inclined surface 226b increases, light leakage in the light incident area of the light guide plate 220, which is adjacent to the light source part 210, increases. Accordingly, the inclination angle $\alpha$ of the inclined surface 226b is set to about 2 degrees to about 5 degrees to prevent light leakage.

The light guide plate 220 further includes a plurality of lenticular protrusions 227 formed on the exit surface 225.

For example, the exit surface 225 may be divided into a first area A1 and a second area A2 sequentially arranged from the incident surface 223. In this case, the protrusions 227 may be disposed only in the second area A2 and not in the first area A1. In a present exemplary embodiment, the second area A2 includes a first lenticular area RA1 and a second lenticular area RA2.

The protrusions 227 includes a plurality of semi-circular conical protrusions extending in the first lenticular area RA1 in a direction perpendicular to the longitudinal direction D2 of the incident surface 223 and a plurality of semi-circular cylindrical protrusions in the second lenticular area RA2 extending in a direction perpendicular to the longitudinal direction of the incident surface 223. In detail, the protrusions 227 have height and diameter that increase in the first lenticular area RA1 with increasing distance from the incident surface 223.

Figure 4:
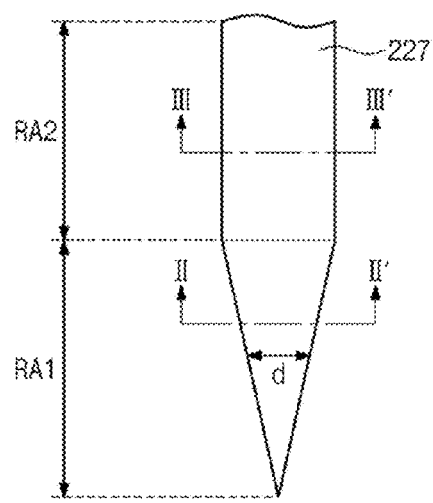
FIG. 4 is a plan view of a protrusion portion.
Figure 5:
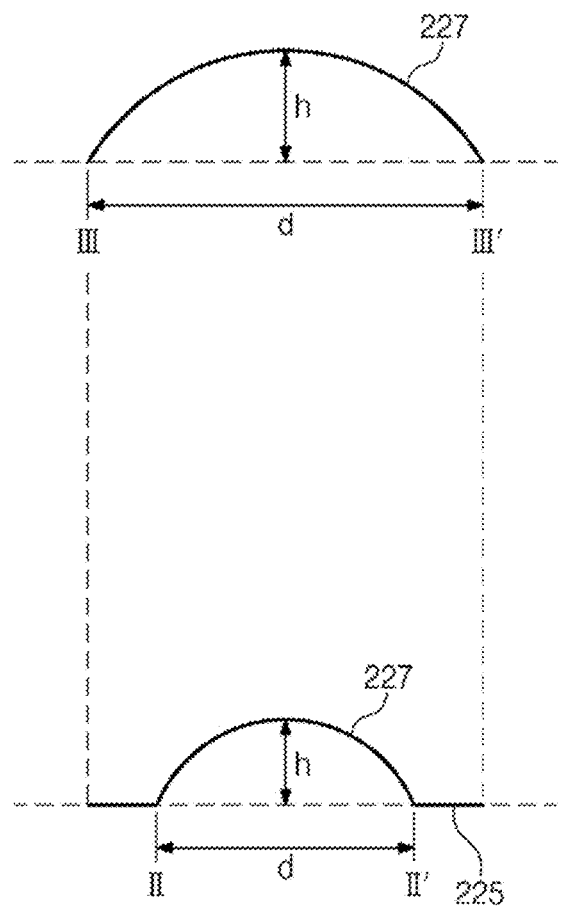
FIG. 5 is a cross-sectional view taken along lines II-II" and shown in FIG. 4 to show the protrusion portion.

FIG. 4 is a plan view of the protrusions and FIG. 5 is a cross-sectional view taken along lines II-II' and III-III' shown in FIG. 4 to show the protrusions.

Referring to FIGS. 4 and 5, a cross section of each protrusion 227 along the longitudinal direction D2 of the incident surface 223 has a semi-circular shape. Referring to the height and the diameter of a protrusion 227 as "h" and "d", respectively, the height h and the diameter d of each protrusion 227 increases linearly in the first lenticular area RA1 with respect to the distance from the first area A1. The rate of the increase of the height h of the protrusion 227 is the same as the rate of the increase of the diameter d of the protrusion 227, so that a ratio $$\frac{h}{d}$$

of the protrusion 227 is constant in the first lenticular area RA1.

In addition, each protrusion 227 has a constant height h and a constant diameter d in the second lenticular area RA2. For example, the height to diameter ratio of a protrusion 227 is the same in the first and second lenticular areas RA1 and RA2.

As another exemplary embodiment, however, the protrusions 227 may have a semi-circular conical shape in the second lenticular area RA2. That is, the height h and the diameter d of a protrusion 227 may increase in the second lenticular area RA2 with increasing distance from the first area A1.

Figure 6:
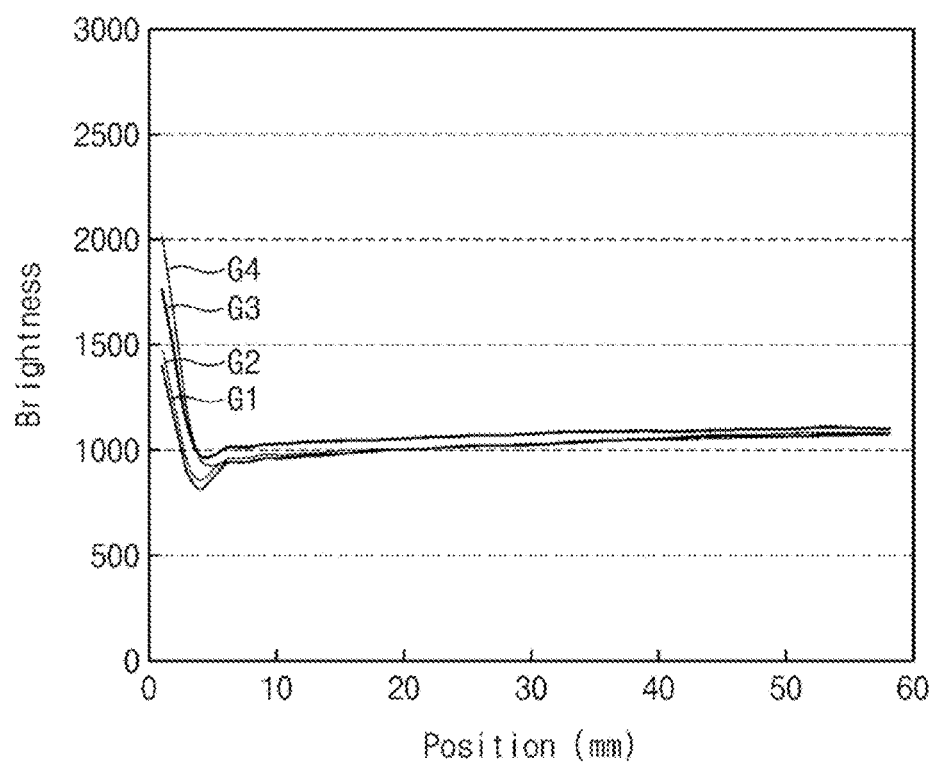
FIG. 6 is a graph of brightness as a function of position in a light guide plate when the protrusion portion disposed in a first lenticular area has the same shape as the protrusion portion disposed in a second lenticular area.

FIG. 6 is a graph of brightness as a function of position in the light guide plate when the protrusions disposed in the first lenticular area have the same shape as the protrusions disposed in the second lenticular area. In FIG. 6, the x-axis indicates distance on the light guide plate 220 from the incident surface 223 and the y-axis indicates the brightness. In addition, a first graph G1 represents the brightness when the height h and diameter d of a protrusion 227 are about 7 and 100 micrometers, respectively, a second graph G2 represents the brightness when the height h and diameter d of a protrusion 227 are about 8 and 100 micrometers, respectively, a third graph G3 represents the brightness when the height h and diameter d of a protrusion 227 are about 10 and 100 micrometers, respectively, and a fourth graph G4 represents the brightness when the height h and diameter d of a protrusion 227 are about 10 and 50 micrometers, respectively.

Referring to FIG. 6, when the first and second lenticular areas RA1 and RA2 have protrusions 227 with the same shape, the brightness increases in the light incident portion of the light guide plate 220, so that light leakage occurs.

In particular, as the height h of the protrusions 227 increases with a constant diameter d, e.g., about 100 micrometers, the brightness in the light incident area increases. In addition, as the diameter d of the protrusions 227 decreases with constant height h, e.g., about 10 micrometers, the brightness in the light incident area increases. Consequently, light leakage increases as the curvature of the protrusion portion 227 increases.

Figure 7:
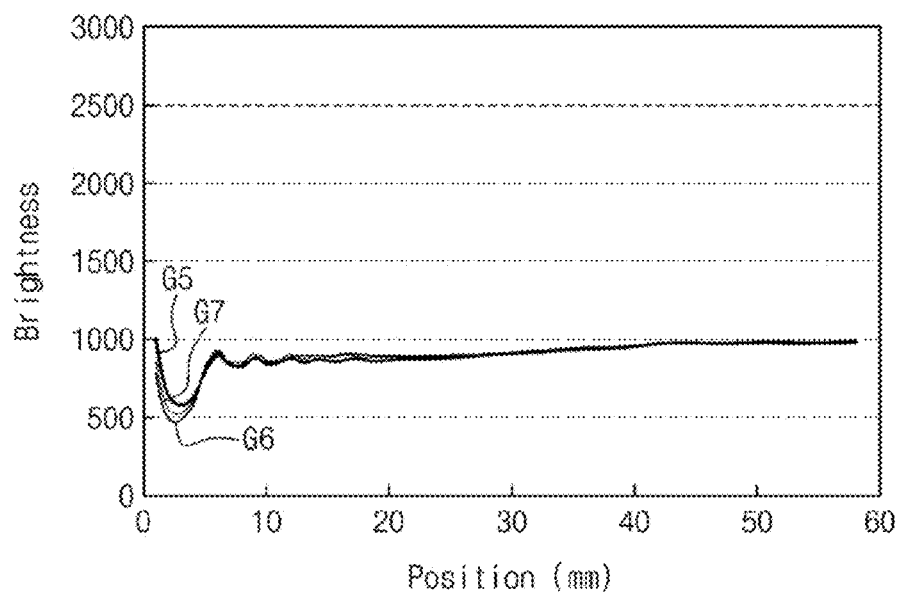
FIG. 7 is a graph of brightness as a function of distance in the light guide plate from the start point of the incident surface.

FIG. 7 is a graph of brightness as a function of distance in the light guide plate from the incident surface 223. In FIG. 7, the x-axis indicates distance from the incident surface 223 of the light guide plate 220 and the y-axis indicates the brightness. In addition, a fifth graph G5 for a first case represents the brightness when the first lenticular area RA1 extends from about 0 mm to about 50 mm from the incident surface 223 of the light guide plate 220, a sixth graph G6 for a second case represents the brightness when the first lenticular area RA1 extends from about 3.5 mm to about 50 mm from the incident surface 223 of the light guide plate 220, and a seventh graph G7 for a third case represents the brightness when that the first lenticular area RA1 extends from about 2.5 mm to about 50 mm from the incident surface 223 of the light guide plate 220.

Referring to FIG. 7, the start position of the first lenticular area RA1 in the first case is where the exit surface 225 makes contact with the incident surface 223 of the light guide plate 220. In the second and third cases, however, the start points of the first lenticular area RA1 are respectively spaced inward from the incident surface 223 by distances of about 3.5 mm and 2.5 mm.

As shown by the fifth, sixth, and seventh graphs G5, G6, and G7, the brightness in the light incident area of the first case is greater than the brightness in the light incident area of the second and third cases. That is, when the start point of the first lenticular area RA1 is set to be the contact position with the incident surface 223 of the light guide plate 220, the light leakage occurs.

Accordingly, when a first area A1 lacking the protrusion portion 227 is provided between the first lenticular area RA1 and the incident surface 223, light leakage may be prevented.

Figure 8:
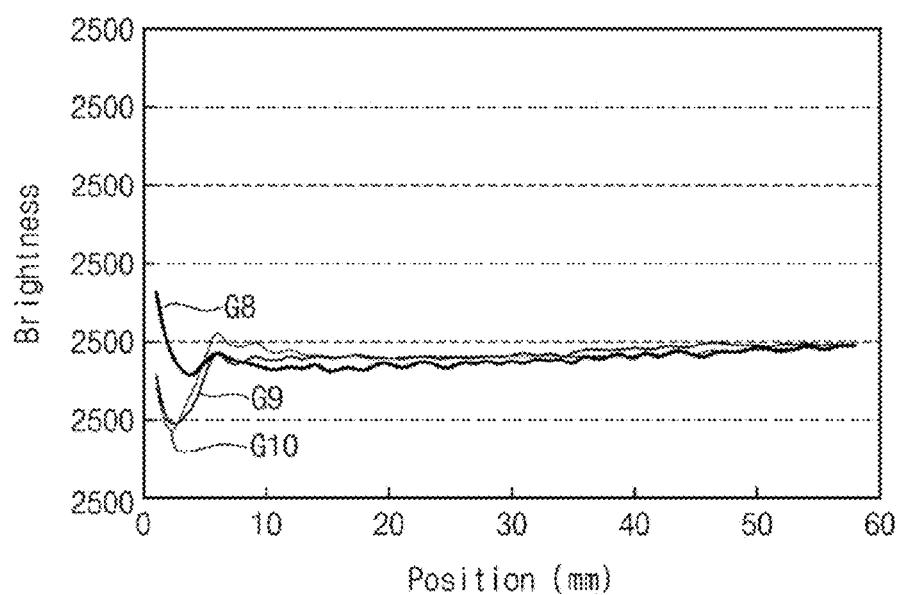
FIG. 8 is a graph of brightness as a function of distance in the light guide plate from the incident surface according to the width of the first lenticular area.

FIG. 8 is a graph of brightness as a function of distance in the light guide plate from the incident surface 223 according to the width in the D1 direction of the first lenticular area. In FIG. 8, the x-axis indicates distance from the incident surface 223 of the light guide plate 220 and the y-axis indicates the brightness. In addition, an eighth graph G8 for a fourth case represents the brightness when the first lenticular area RA1 extends from about 2.5 mm to about 10 min from the incident surface 223 of the light guide plate 220, a ninth graph G9 for a fifth case represents the brightness when the first lenticular area RA1 extends from about 3.5 mm to about 50 mm from the incident surface 223 of the light guide plate 220, and a tenth graph G10 for a sixth case represents the brightness when the first lenticular area RA1 extends from about 2.5 mm to about 50 mm from the incident surface 223 of the light guide plate 220.

Referring to FIG. 8, the first lenticular area RA1 has a width of about 7.5 mm in the fourth case, a width of about 46.5 mm in the fifth case, and a width of about 20 mm in the sixth case. In this case, the width of the first lenticular area RA1 indicates the width in a direction perpendicular to the longitudinal direction of the incident surface 223.

As the width of the first lenticular area RA1 decreases, a slope of the protrusions 227 formed in the first lenticular area RA1 increases. That is, when the first lenticular area RA1 is narrower, e.g., about 7.5 mm as in the fourth case, the slope of the protrusions 227 more rapidly increases so that the height h of the protrusions 227 can reach a desired height within the about 7.5 mm width. When the first lenticular area RA1 is wider, e.g., about 46.5 mm as in the fifth case, the slope of the protrusions 227 is less steep.

As shown by the eighth, ninth, and tenth graphs G8, G9, and G10, the brightness in the light incident area in the fourth case increases when the first lenticular area RA1 is narrower, e.g., about 7.5 mm, thus causing light leakage.

Referring to FIG. 3 again, representing the width of the first lenticular area RA1 in the D1 direction as "a" and a maximum height of the protrusion portion 227 in the first lenticular area RA1 as "b", an angle θ is defined by the ratio of "b" over "a" as expressed by the following Equation:

$$\tan(\theta) = \frac{b}{a} \qquad \text{Equation (1)}$$

As described above, to prevent light leakage, the slope of the protrusion portion 227 should be gentle. To this end, the protrusion portion 227 may be formed such that the "θ" is less than 0.03 degrees, or equivalently, the tan(θ) is less than about $5.2 \times 10^{-4}$.

Figure 9:
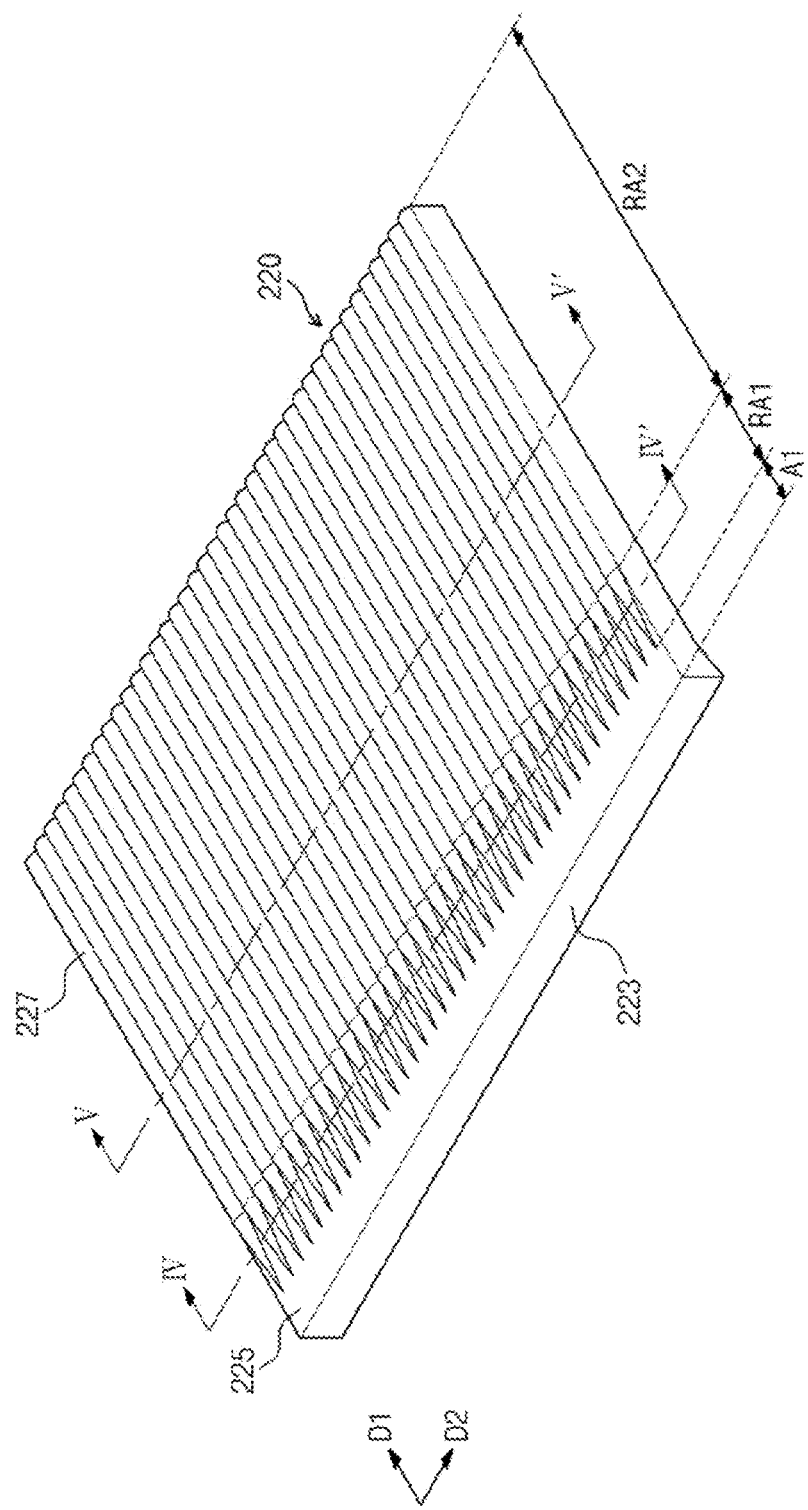
FIG. 9 is a perspective view of a light guide plate shown in FIG. 1.
Figure 10:
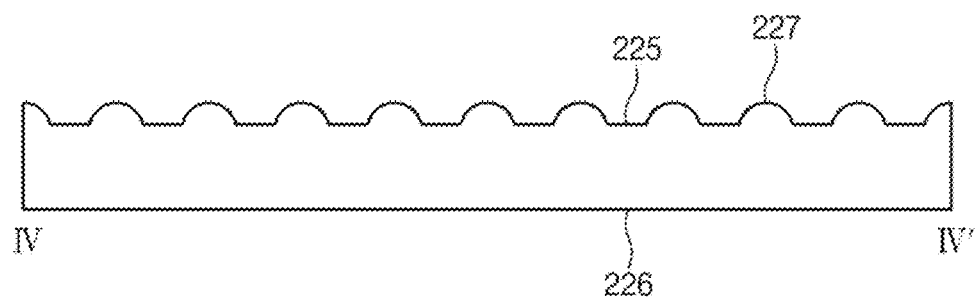
FIG. 10 is a cross-sectional view taken along a line IV-IV' shown in FIG. 9.
Figure 11:
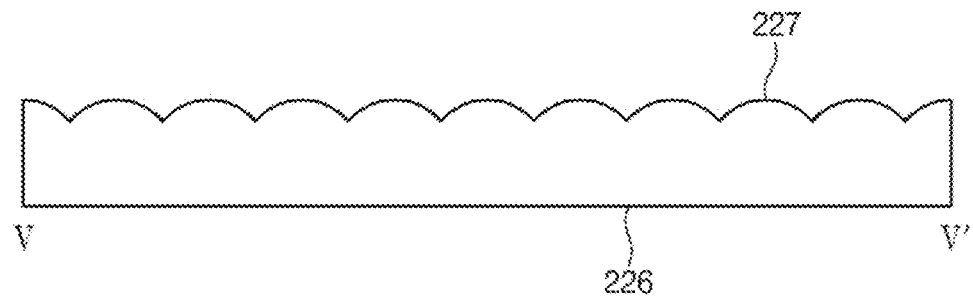
FIG. 11 is a cross-sectional view taken along a line V-V'; shown in FIG. 9.

FIG. 9 is a perspective view of the light guide plate shown in FIG. 1, FIG. 10 is a cross-sectional view taken along a line IV-IV' shown in FIG. 9, and FIG. 11 is a cross-sectional view taken along a line V-V'; shown in FIG. 9.

Referring to FIGS. 9 and 10, the light guide plate 220 includes the lenticular protrusions 227 disposed on the exit surface 225 thereof. According to a present exemplary embodiment, the lenticular shape is a semi-circular lens shape, but lenticular shapes are not limited to ae semi-circular lens shape. That is, a lenticular shape may be a semi-oval shape.

The exit surface 225 is divided into the first area A1 and the second area A2 sequentially arranged from the incident surface 223. The protrusions 227 are disposed only in the second area A2, and not in the first area A1. In a present exemplary embodiment, the second area A2 includes the first lenticular area RA1 and the second lenticular area RA2.

The protrusions 227 have a semi-circular conical shape elongated in the first lenticular area RA1 in the D1 direction perpendicular to the longitudinal direction D2 of the incident surface 223, and have a semi-circular cylindrical shape in the second lenticular area RA2 elongated in the D1 direction perpendicular to the longitudinal direction D2 of the incident surface 223. In detail, each protrusion 227 has a height and diameter in the first lenticular area RA1 that increases with increasing distance of the protrusion portion 227 from the incident surface 223.

As shown in FIG. 10, a cross section of the protrusions 227 of the light guide plate 220 in the first lenticular area RA1 along the D2 direction of the incident surface 223 have a semi-circular shape.

As shown in FIG. 11, a cross section of the protrusions 227 of the light guide plate 220 in the second lenticular area RA2 along the D2 direction of the incident surface 223 have a semi-circular shape. The height h and diameter d of the protrusions 227 in the second lenticular area RA2 are greater than the height h and diameter d of the protrusions 227 in the first lenticular area RA1.

In particular, a plurality of protrusions 227 are provided in the first and second lenticular areas RA1 and RA2, and the protrusions 227 are successively arranged in the second lenticular area RA2 along the D2 direction of the incident surface 223 without being spaced apart from each other. However, since the protrusions 227 in the first lenticular area RA1 have a diameter d less than that of the protrusions 227 in the second lenticular area RA2, there may be flat surfaces, i.e., portions of the exit surface 225, between the protrusions 227 in the first lenticular area RA1.

Figure 12:
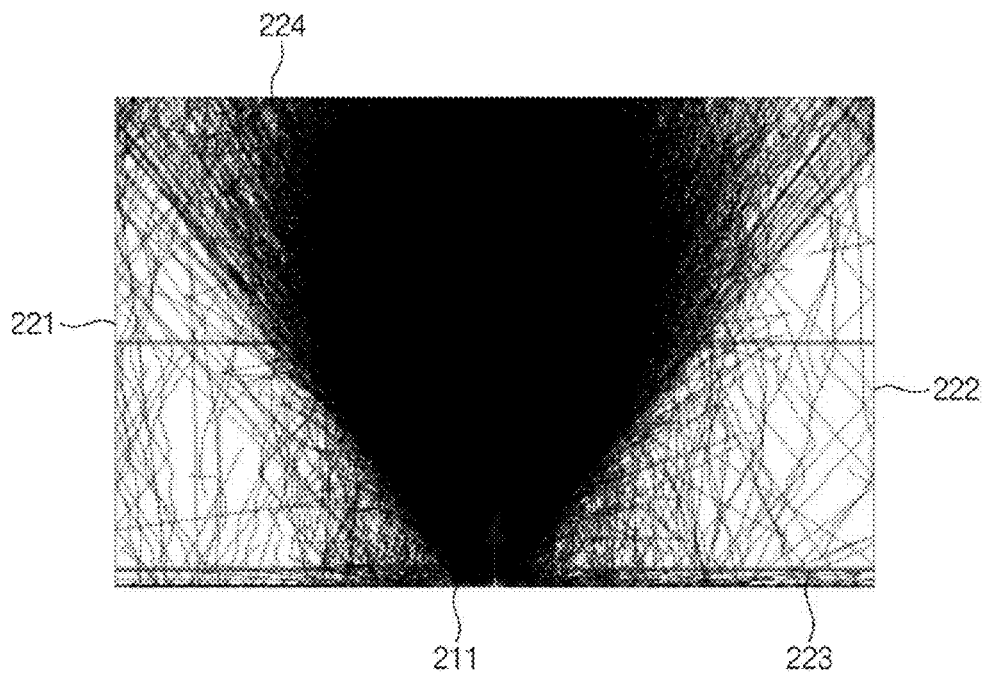
FIG. 12 shows an incident efficiency of light incident to the light guide plate when protrusion portions are formed on an exit surface of the light guide plate.
Figure 13:
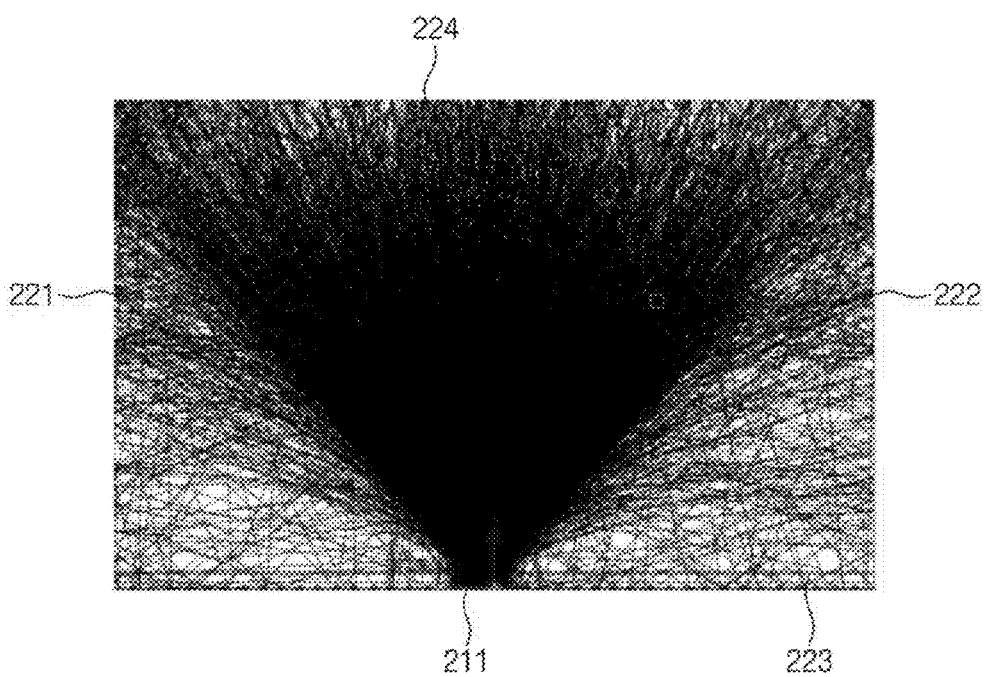
FIG. 13 shows an incident efficiency of light incident to the light guide plate lacking protrusion portions on an exit surface of the light guide plate.

FIG. 12 shows an incident efficiency of light incident to the light guide plate when protrusions are formed on an exit surface of the light guide plate and FIG. 13 shows an incident efficiency of light incident to a light guide plate lacking protrusions on an exit surface of the light guide plate. Here, the incident efficiency of the light means a ratio of the amount of the light exiting from the opposite surface 224 to the amount of the light incident through the incident surface 223.

Referring to FIG. 12, the light emitting diodes 211 are disposed adjacent to the incident surface 223 and arranged along the D2 direction of the incident surface 223. FIG. 12 shows light paths of light emitted from the light emitting diodes 211 when the protrusions 227 are formed on the exit surface 225 after some of the light emitting diodes, e.g., three light emitting diodes located at a center portion, are turned on.

FIG. 13 shows the light paths of light emitted from the light emitting diodes 211 when the protrusions 227 are not formed on the exit surface 225 after some of the light emitting diodes, e.g., three light emitting diodes, located at the center portion among the light emitting diodes 211, are turned on.

Referring to FIGS. 12 and 13, when the protrusions 227 are formed, the amount of light propagating to the first and second side surfaces 221 and 222 of the light guide plate 220 is less than the amount of the light propagating to the first and second side surfaces 221 and 222 when the protrusions 227 are not formed. In addition, when the protrusions 227 are formed, the amount of the light propagating to the opposite surface 224, i.e., the fourth side surface, facing the incident surface 223 is greater than the amount of the light propagating to the opposite surface 224 when the protrusions 227 are not formed.

Further, when the protrusions 227 are formed on the exit surface 225, the amount of the light leaking through the first and second side surfaces 221 and 222 may be reduced, enhancing the amount of the light exiting from the exit surface 225 of the light guide plate 220.

TABLE

|  | Protrusions exist | No protrusions exist |
|---|---|---|
| Incident surface (third side surface) | 100% | 100% |
| First and second side surfaces | 3.1% | 13.7% |
| Front surface (exit surface) | 87.24% | 76.9% |

As shown in the Table, of the light incident to the incident surface 223, the amount of the light leaked through the first and second side surfaces 221 and 222 is about 3.1% when the protrusions 227 exist, but is about 13.7% when the protrusions 227 do not exist. In addition, the amount of the light exiting from the front surface 225, i.e., the exit surface, is about 87.24% when the protrusions 227 exist, but is about 76.9% when the protrusions 227 do not exist. That is, the amount of the light leaked through the first and second side surfaces 221 and 222 is reduced by a factor of about four, and the amount of the light exiting from the front surface 225, i.e., the exit surface, is enhanced by about 10%.

That is, when the protrusions 227 are formed on the exit surface 225, front brightness of the light guide plate 220 may be increased, thereby improving the light efficiency of the backlight unit 200.

Figure 14:
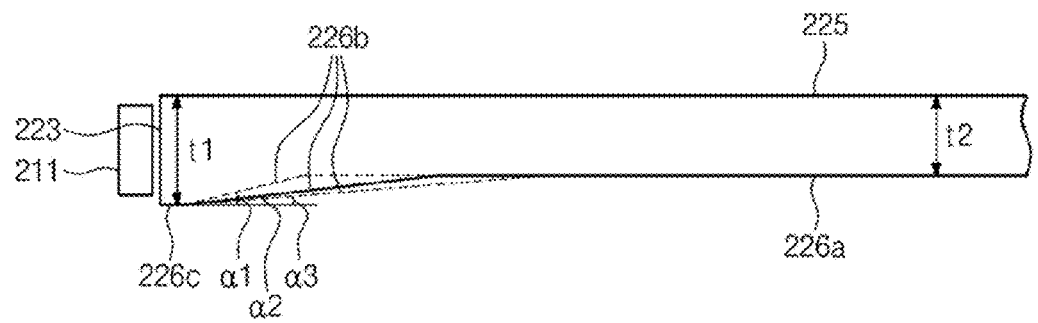
FIG. 14 is a cross-sectional view showing an inclination angle of an inclined plane and a width of an area in which the inclined plane exists.

FIG. 14 is a cross-sectional view showing the inclination angle of the inclined plane and the width of the area in which the inclined plane exists.

Referring to FIG. 14, the reflection surface 226 of the light guide plate 220 includes the first flat surface 226a substantially parallel to the exit surface 225, the inclined surface 226b adjacent to the first flat surface 226a and inclined with respect to the exit surface 225, and the second flat surface 226c connecting the inclined surface 226b and the incident surface 223. The inclination of the inclined surface 226b is such that a distance of the inclined surface 226b from the exit surface 225 increases as the inclined surface 226b comes closer to the incident surface 223.

The light guide plate 220 has a first thickness t1 in an area corresponding to the second flat surface 226c. That is, the first thickness t1 is equal to a distance t1 between the second flat surface 226c and the exit surface 225. The thickness of the light guide plate 220 is gradually decreases in an area corresponding to the inclined surface 226b and is constant in an area corresponding to the first flat surface 226a. In other words, the light guide plate 220 has a second thickness t2 in the area of the first flat surface 226a, which is equal to a distance between the first flat surface 226a and the exit surface 225, and less than the first thickness t1. For example, the first thickness t1 may be about 0.54 mm and the second thickness t2 may be about 0.4 mm.

The inclined surface 226b connects the first flat surface 226a and the second flat surface 226c. When a triangle is defined to include the inclined surface 226b as its hypotenuse, a bottom side of the triangle corresponds to the width of the inclined surface 226b in the first D1 direction. In a present exemplary embodiment, the width of the inclined surface 226b is in a range of about 1.3 mm to about 2.5 mm. A height of the triangle corresponds to a difference between the first thickness t1 and the second thickness t2. In addition, although a length of the hypotenuse may vary, the height of the triangle is constant.

In this case, as the inclination angle of the inclined surface 226b decreases from a first angle α1 to a second angle α2 and a third angle α3 less than the second angle α2, the slope of the inclined surface 226b becomes gentler. The inclination angle corresponds to an angle between the bottom side of the triangle and the hypotenuse of the triangle. Since the height of the triangle remains constant, the length of the bottom side of the triangle decreases as the inclination angle increases.

If the width of the inclined surface 226b is reduced to be less than about 0.1 mm, light leakage in the light incident area increases. This means that light leakage increases as the slope of the inclined surface 226b increases, and thus the inclination angle of the inclined surface 226b may be in the range of about 2 degrees to about 5 degrees.

Figure 15:
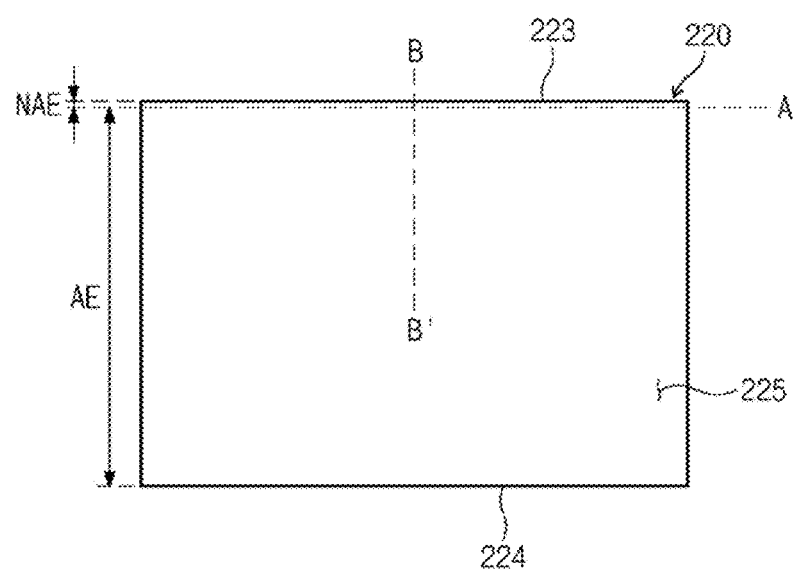
FIG. 15 is a plan view of a light guide plate.
Figure 16:
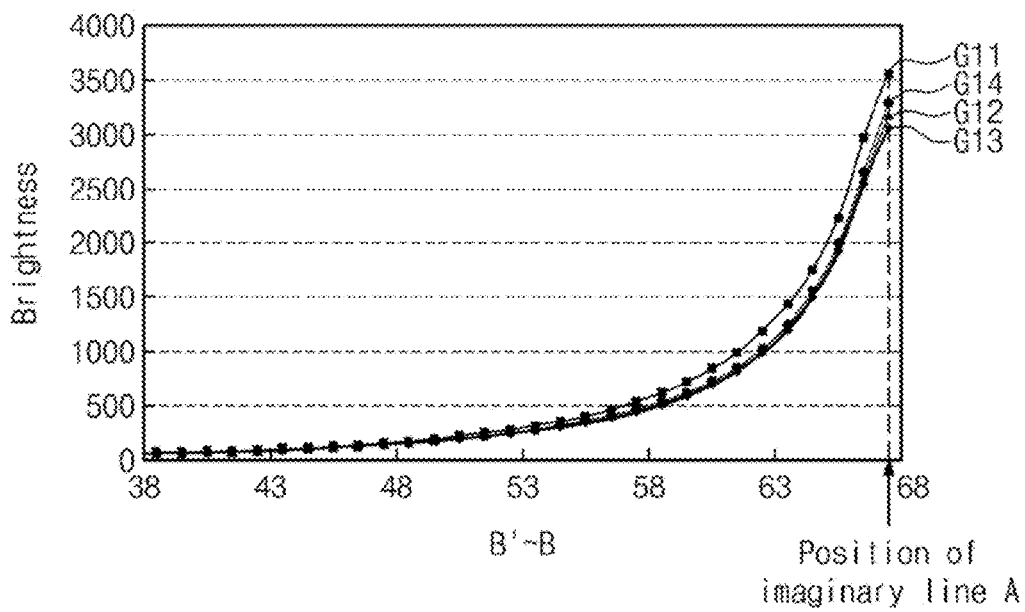
FIG. 16 is a graph of an average brightness measured along a cut line B-B' shown in FIG. 15.
Figure 17:
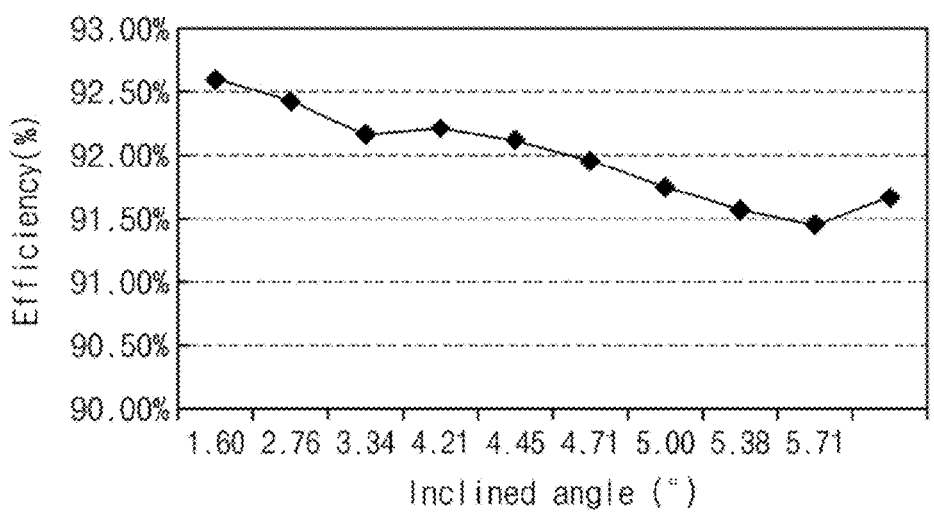
FIG. 17 is a graph of light incident efficiency as a function of an inclined angle.
Figure 18:
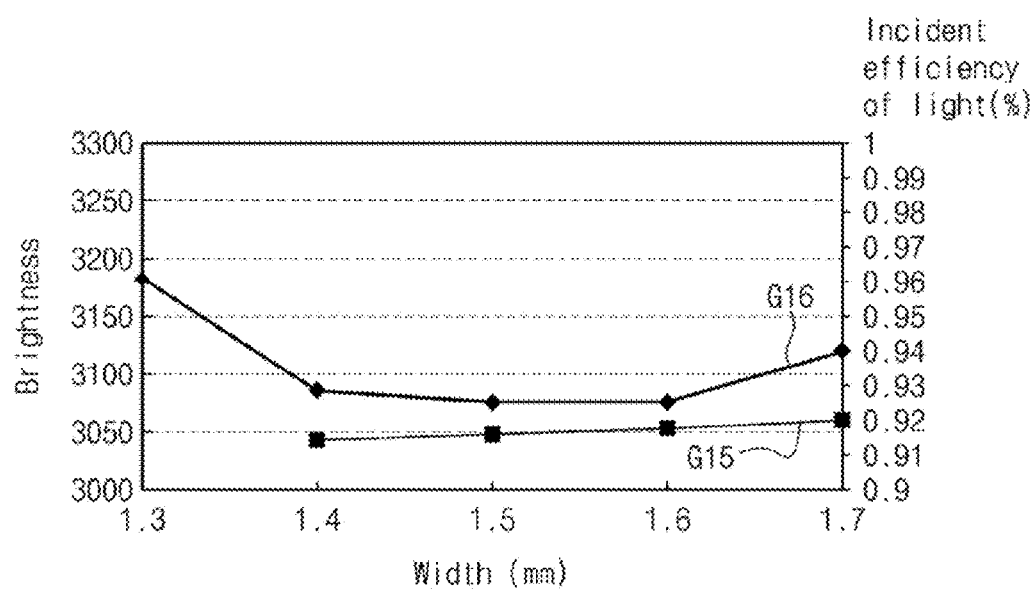
FIG. 18 is a graph of brightness and light incident efficiency as a function of a width of an inclined plane.

FIG. 15 is a plan view of the light guide plate and FIG. 16 is a graph of an average brightness measured along a cut line B-B' shown in FIG. 15. FIG. 17 is a graph of the light incident efficiency as a function of the inclined angle and FIG. 18 is a graph of the brightness and the light incident efficiency as a function of the width of the area in which the inclined plane is formed.

Referring to FIGS. 15 and 16, the cut lint B-B' indicates the direction of a cross section of the light guide plate 220 from the incident surface 223 toward the opposite surface 224, and the exit surface 225 of the light guide plate 220 is divided into an effective light emitting area AE and a non-effective light emitting area NAE with reference to an imaginary line A. That is, an area between the incident surface 223 and the imaginary line A is defined as the non-effective light emitting area NAE and an area between the imaginary line A and the opposite surface 224 is defined as the effective light emitting area AE.

FIG. 16 is a graph of the average brightness between a point on line B-B' and the imaginary line A in the effective light emitting area AE. In FIG. 16, an eleventh graph G11 represents the average brightness of points on B-B' when the width of the inclined surface 226b is about 1.0 mm, a twelfth graph G12 represents the average brightness of points on B-B' when the width of the inclined surface 226b is about 1.3 mm, a thirteenth graph G13 represents the average brightness of points on B-B' when the width of the inclined surface 226b is about 1.6 mm, and a fourteenth graph G14 represents the average brightness of points on B-B' when the width of the inclined surface 226b is about 2.5 mm.

As shown in FIG. 16, the average brightness at the position of the imaginary line A is highest when the width of the inclined surface 226b about 1.0 mm. In particular, there is a small difference between the average brightness at imaginary line A when the width of the inclined surface 226b is about 1.3 mm (G12) and the average brightness at imaginary line A when the width of the inclined surface 226b is about 2.5 mm (G14). When the width of the inclined surface 226b is about 1.0 mm (G11), however, the average brightness at imaginary line A is about 3500 lux.

As shown in FIG. 17, there is a difference of about 1% in the light incident efficiency as a function of the inclined angle of the inclined surface 226b. In addition, as shown in FIG. 18, there is a difference of about 1% in the light incident efficiency as a function of the width of the inclined surface 226b.

Thus, the difference is small between the light incident efficiency as a function of the inclined angle of the inclined surface 226b and the light incident efficiency as a function of the width of the inclined surface 226b.

However, as shown in FIGS. 16 and 18, when the width of the inclined surface 226b is reduced to be less than 1.0 mm, the average brightness rapidly increases. In FIG. 18, a fifteenth graph G15 represents the light incident efficiency as a function of the width of the inclined surface 226b, and the sixteenth graph G16 represents the brightness as a function of the width of the inclined surface 226b.

In a present exemplary embodiment, the width of the inclined surface 226b may be greater than or equal to about 1.3 mm and the inclined angle α may be from about 2 degrees to about 5 degrees to provide a gentle slope for the inclined surface 226b to prevent light leakage, caused by the increased brightness.

Figure 19A:
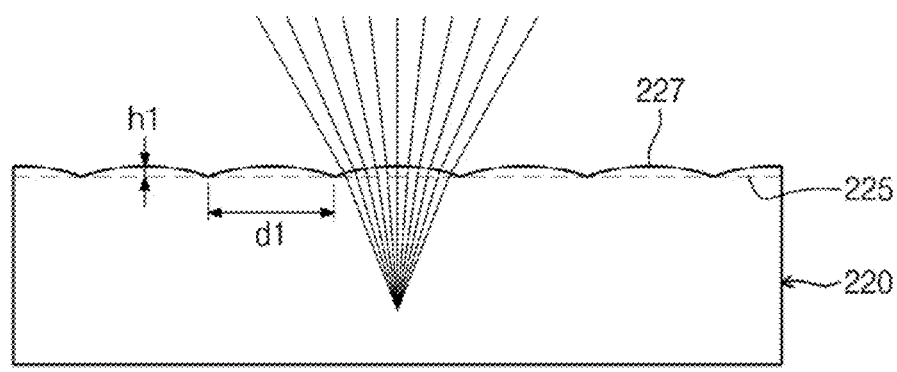
FIGS. 19A and 19B illustrate paths of light propagating in accordance with a curvature of the protrusion.
Figure 19B:
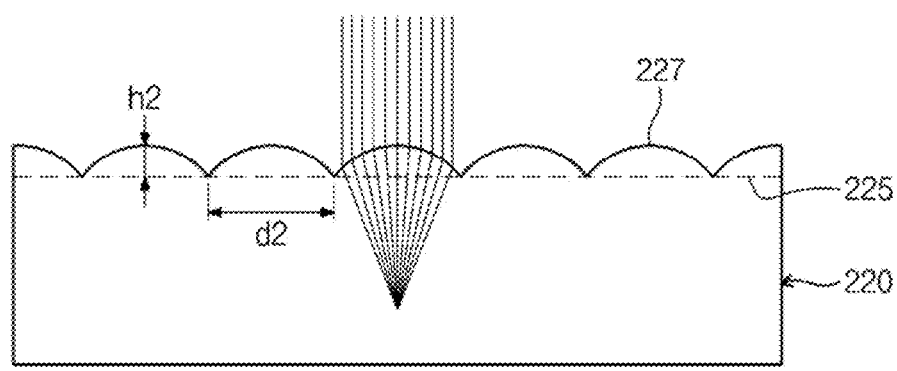

FIGS. 19A and 19B illustrate paths of light propagating in accordance with a curvature of the protrusion. The protrusions 227 in FIG. 19A have a first height h1 of about 8 micrometers and a first diameter d1 of about 160 micrometers, and the protrusions of FIG. 19B have a second height h2 of about 20 micrometers and a second diameter d2 of about 72.5 micrometers.

Referring to FIGS. 19A and 19B, as the curvature of the protrusions 227 increases, the angular spread of light exiting from the light guide plate 220 decreases so that light does not propagate to the first and second side surfaces 221 and 222. Accordingly, the light efficiency of the light guide plate 220 improves as the curvature of the protrusions 227 increases.

However, when the curvature of the protrusions 227 increases, light leakage may increase in the light incident area of the light guide plate 220.

Figure 20:
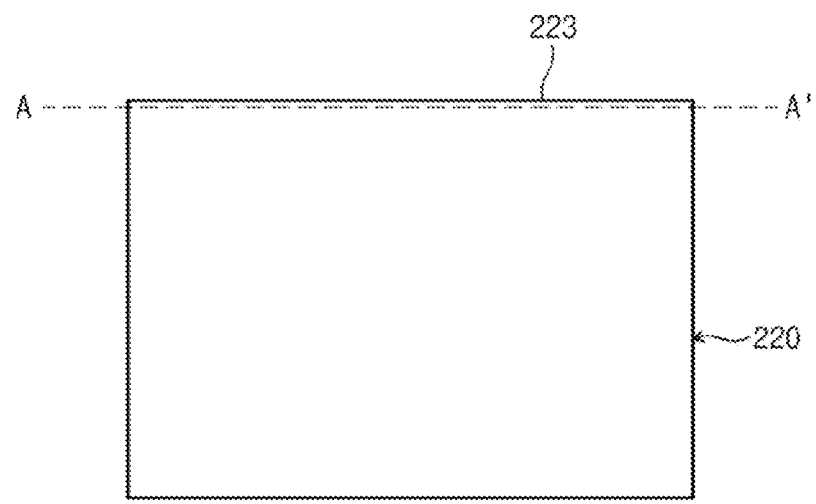
FIG. 20 is a plan view of a light guide plate.
Figure 21:
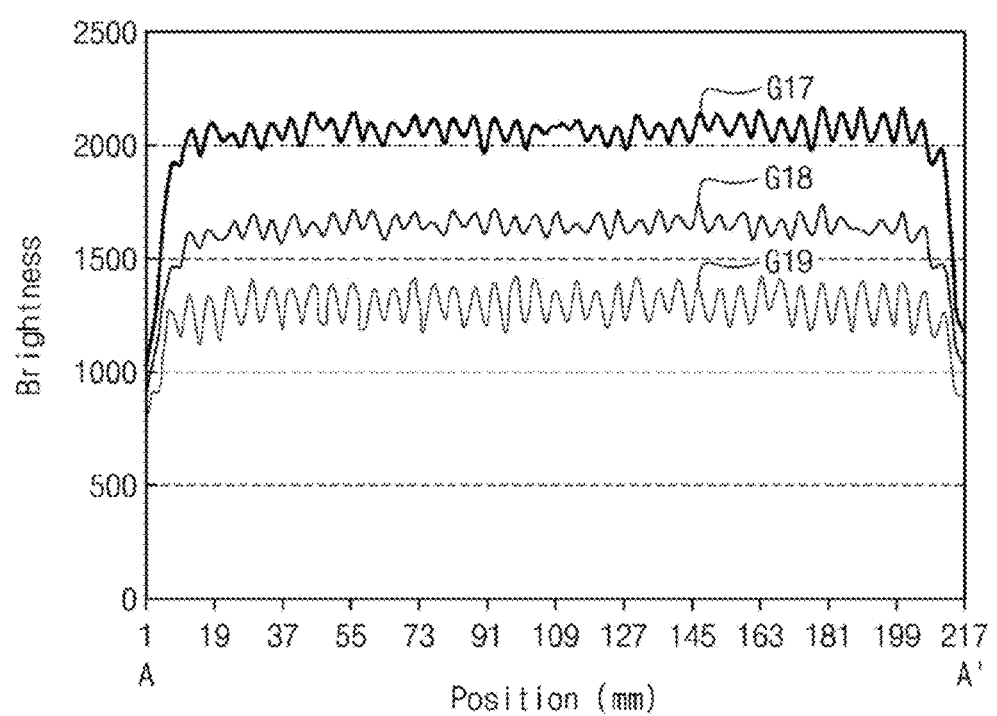
FIG. 21 is a graph of brightness measured along an imaginary line A-A' shown in FIG. 10.

FIG. 20 is a plan view of a light guide plate and FIG. 21 is a graph of brightness measured along the imaginary line A-A' shown in FIG. 20 according to the curvature of the protrusions. In FIG. 21, a seventeenth graph G17 represents the brightness in a seventh case when each protrusion 227 has a height and diameter of about 10 and 50 micrometers, respectively, an eighteenth graph G18 represents the brightness in an eighth case when each protrusion 227 has a height and diameter of about 10 and 100 micrometers, respectively, and a nineteenth graph G19 represents the brightness in a ninth case when each protrusion 227 has a height and diameter of about 5 and 100 micrometers, respectively.

Referring to FIGS. 20 and 21, which compare the seventh and ninth cases, in which the protrusions 227 have the same height of about 10 micrometers, the brightness at imaginary line A-A' in the ninth case for a relatively large diameter protrusion 227 is less than the brightness at imaginary line A-A' in the seventh case for a relatively small diameter protrusion 227. In addition, when comparing the eighth and ninth cases, in which the protrusions 227 have the same diameter of about 100 micrometers, the brightness at imaginary line A-A' in the ninth case for a relatively low protrusion 227 is less than the brightness at the position of the imaginary line A-A' in the eighth case in for a relatively high protrusion 227.

As described above, increasing the curvature of the protrusion 227 enhances the brightness in the light incident area. Thus, the curvature of the protrusions 227 may be set to prevent light leakage. For example, the protrusions 227 may have a height less than or equal to about 8 micrometers and the diameter greater than or equal to about 100 micrometers to reduce brightness in the light incident area to be less than about 1500 lux.

Figure 22:
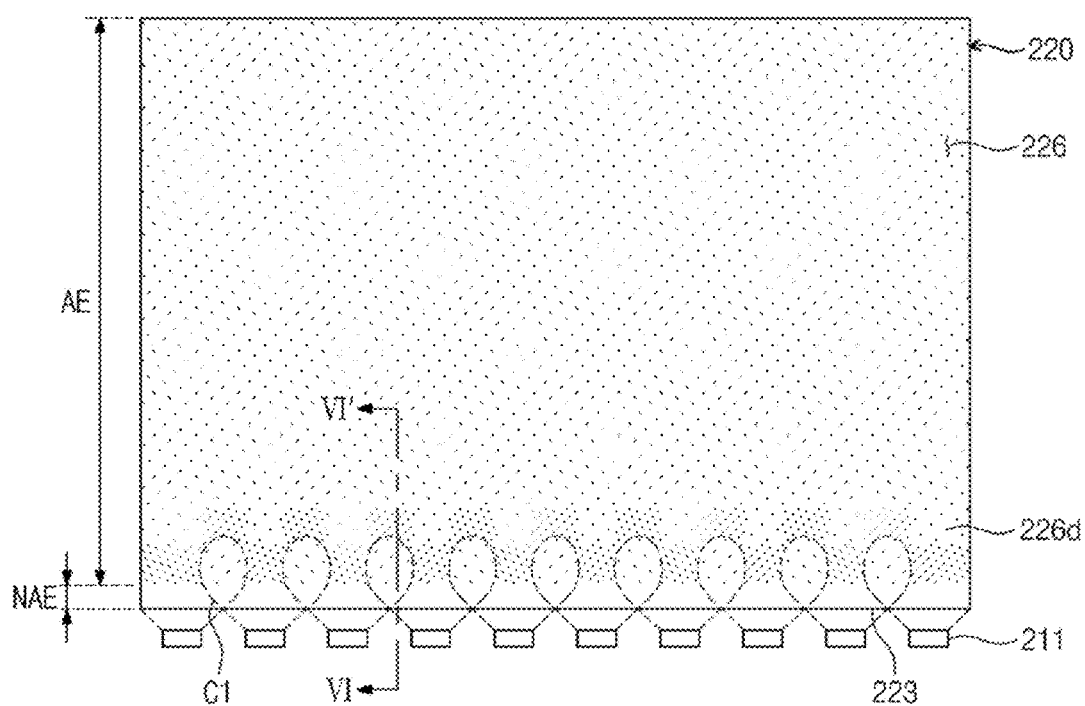
FIG. 22 is a rear view of a light guide plate and a light emitting diode.
Figure 23:
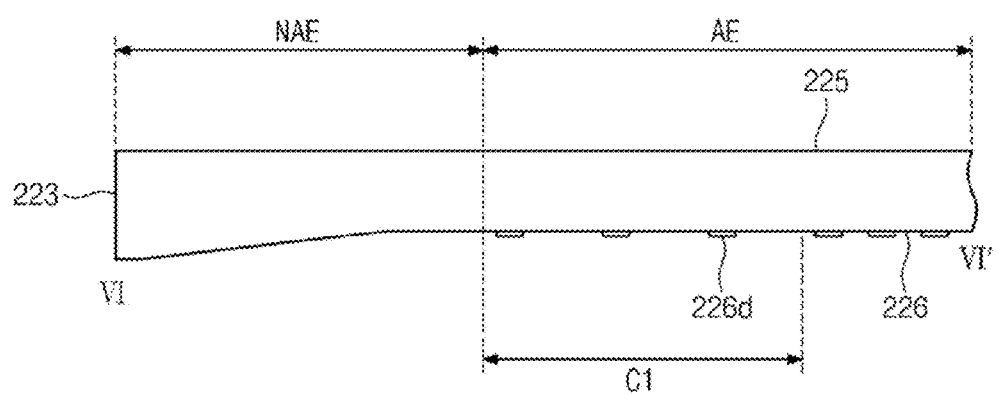
FIG. 23 is a cross-sectional view taken along a line VI-VI' shown in FIG. 22.

FIG. 22 is a rear view of the light guide plate and the light emitting diode and FIG. 23 is a cross-sectional view taken along a line VI-VI' shown in FIG. 22.

Referring to FIGS. 22 and 23, a reflection pattern 226d is formed on the reflection surface 226 of the light guide plate 220. The reflection pattern 226d reflects light incident through the incident surface 223 of the light guide plate 220 such that the light propagates to the exit surface 225.

However, when the lenticular shaped protrusions 227 are formed on the exit surface 225 and the inclined surface 226d is formed on the reflection surface 226, a hot spot phenomenon may occur, in which a higher brightness occurs in an area between two adjacent light emitting diodes 211 in the effective light emitting area AE of the light guide plate 220. Accordingly, a density of the reflection pattern 226d may be varied to prevent the hot spot phenomenon from being perceived by viewers.

For example, the reflection pattern 226d may be formed on the reflection surface 226 to correspond to the effective light emitting area AE of the light guide plate 220.

In the effective light emitting area AE, referring to the brighter area between the two adjacent light emitting diodes 211 as an area C1, the reflection pattern 226d has a relatively low density in the area C1 when compared to that in the surrounding area.

For example, the reflection pattern 226d may be printed on the reflection surface 226 of the light guide plate 220 or be formed by processing the reflection surface 226.

Figure 24:
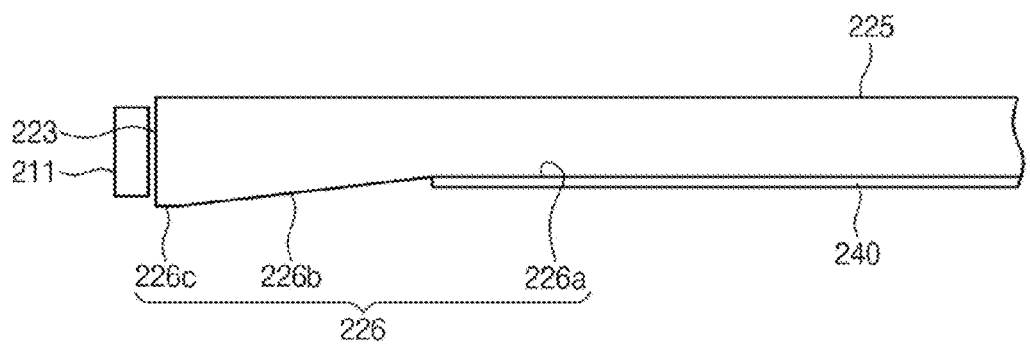
FIG. 24 is a cross-sectional view of a reflection plate according to an exemplary embodiment of the present disclosure.

FIG. 24 is a cross-sectional view of a reflection plate according to an exemplary embodiment of the present disclosure.

Referring to FIG. 24, the reflection plate 240 is disposed under the light guide plate 220. In detail, the reflection plate 240 is disposed under the first flat surface 226a of the reflection surface 226 of the light guide plate 220 and has a flat plate shape substantially parallel to the first flat surface 226a and the exit surface 225. For example, the reflection plate 240 may be, but is not limited to, a highly reflective aluminum sheet. Therefore, the reflection plate 240 reflects light that leaks through the first flat surface 226a.

Figure 25:
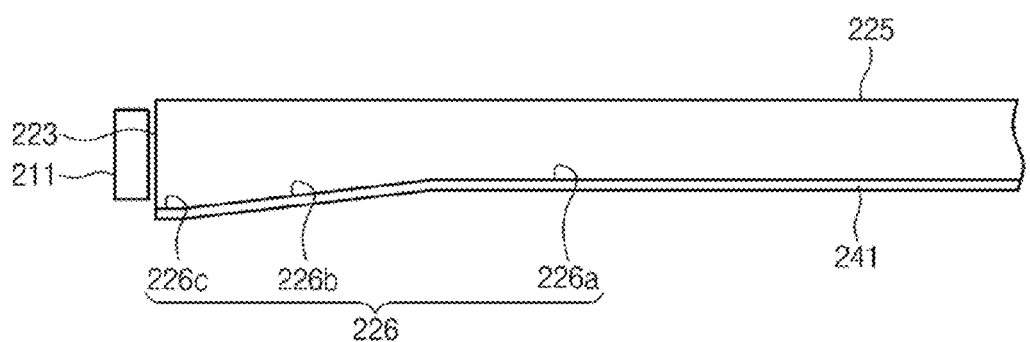
FIG. 25 is a cross-sectional view of a reflection plate according to another exemplary embodiment of the present disclosure.

FIG. 25 is a cross-sectional view of a reflection plate according to another exemplary embodiment of the present disclosure.

Referring to FIG. 25, a reflection plate 241 according to another exemplary embodiment is disposed under the first flat surface 226a, the inclined surface 226b, and the second flat surface 226c and is partially inclined in the area of the inclined surface 226b. Accordingly, the reflection plate 241 reflects light that leaks through the first flat surface 226a, the inclined surface 226b, and the second flat surface 226c.

Figure 26:
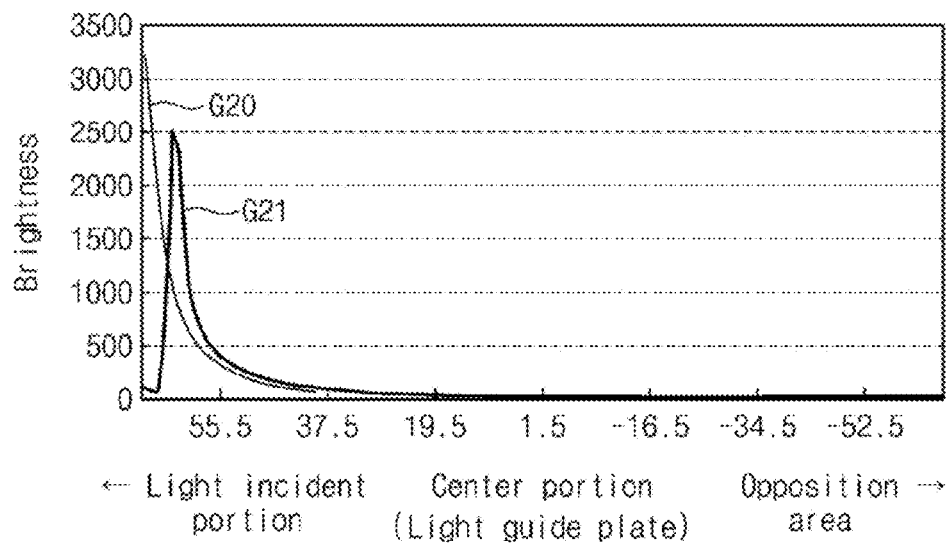
FIG. 26 is a graph of brightness in an area to which the light is incident according to a shape of the reflection plate.

FIG. 26 is a graph of brightness in an area to which the light is incident according to a shape of the reflection plate. In FIG. 26, an x-axis indicates a distance in the light incident area and the opposite area from a center point of the light guide plate 220 and a y-axis indicates brightness. A twentieth graph G20 represents a brightness distribution when using the reflection plate 240 shown in FIG. 24 and a twenty-first graph G21 represents a brightness distribution of the brightness when using the reflection plate 241 shown in FIG. 25.

As shown in FIG. 26, when the reflection plate 241 extends to the inclined surface 226b and the second flat surface 226c, the brightness of the light incident area is less than the brightness of the light incident area when the reflection plate 240 corresponds to the first flat surface 226a.

As described above, the reflection plate 241 may be disposed under the first flat surface 226a, the inclined surface 226b, and the second flat surface 226c to prevent light leakage in the light incident area.

Figure 27:
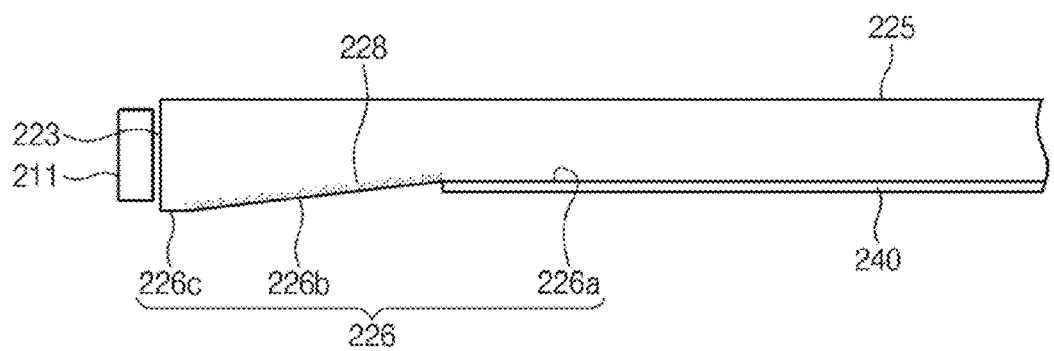
FIG. 27 is a cross-sectional view of a light guide plate and a reflection plate according to another exemplary embodiment of the present disclosure.

FIG. 27 is a cross-sectional view of a light guide plate and a reflection plate according to another exemplary embodiment of the present disclosure.

Referring to FIG. 27, if the reflection plate 240 is disposed under the first flat surface 226a of the light guide plate 220, the inclined surface 226b of the light guide plate 220 may be dispersion-treated. In detail, the inclined surface 226b is dispersion-treated by using a dispersion agent, and thus preventing a brightness increase in the light incident area.

In this case, although the reflection plate 240 does not extend to the inclined surface 226b and the second flat surface 226c, light leakage may be prevented.

Figure 28:
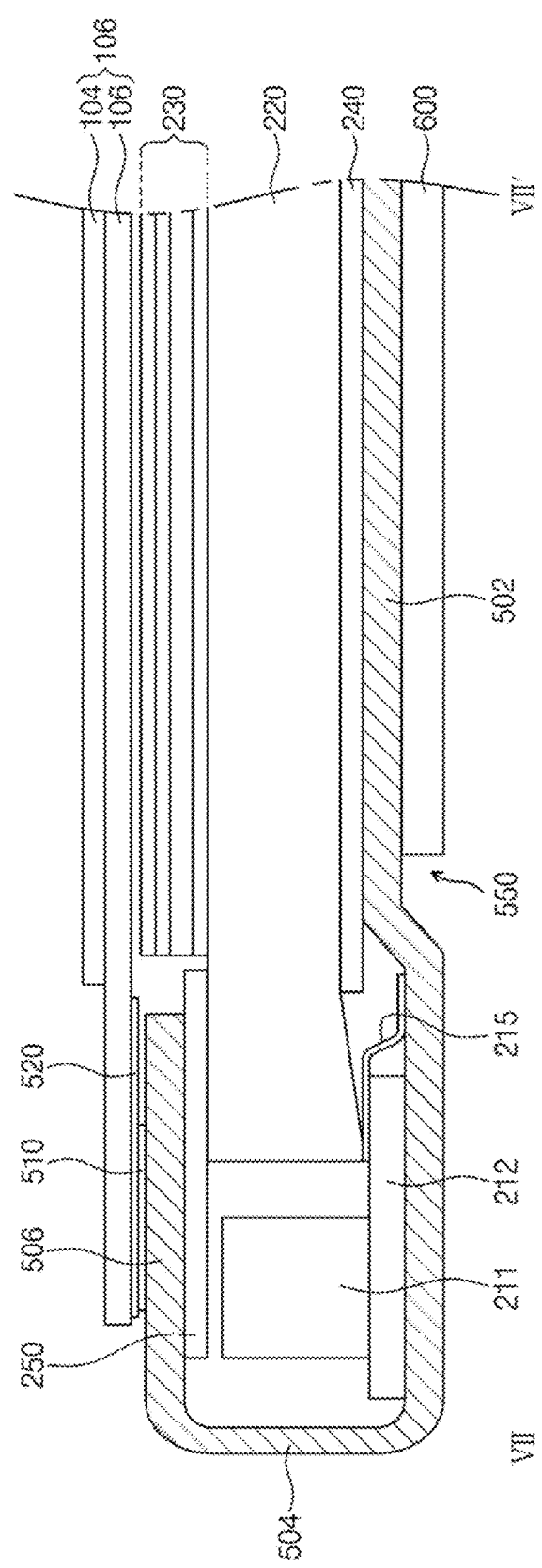
FIG. 28 is a cross-sectional view taken along a line VII-VII' shown in FIG. 1.

FIG. 28 is a cross-sectional view taken along a line VII-VII' shown in FIG. 1.

Referring to FIG. 28, the backlight unit 200 is accommodated on the bottom portion 502 of the bottom chassis 500. The light source part 210 is accommodated in a receiving space defined by the bottom portion 502, the sidewall 504, and the cover portion 506.

The support film 212 of the light source part 210 is fixed to the bottom portion 502 of the bottom chassis 500 by a reflective tape 215. The reflective tape 215 includes a white-colored material, and thus reflects light leaking from the light guide plate 220.

The light guide plate 220 is accommodated in the bottom chassis 500 such that the incident surface 223 of the light guide plate 220 is disposed adjacent to the light source part 210. The reflection plate 240 is disposed between the light guide plate 220 and the bottom portion 502. The reflection plate 240 is disposed under to the first flat surface 226a of the light guide plate 220.

The optical sheets 230 are disposed on the light guide plate 220. The optical sheets 230 include four sheets. In detail, the optical sheets 230 include one diffusion sheet, two prism sheets, and one protective sheet.

A reflective sheet 250 may be further disposed on an inner side surface of the cover portion 506 of the bottom chassis 500 to cover the exit surface 225 corresponding to the non-effective light emitting area NAE of the light guide plate 220. The reflective sheet 250 may prevent light from leaking out of the non-effective light emitting area NAE.

The display panel 106 is disposed on the cover portion 506. A double-sided adhesive tape 510 is disposed between the cover portion 506 and the display panel 106 to fix the display panel 106 to the cover portion 506. In addition, a buffer film 520 is further disposed between the double-sided adhesive tape 510 and the display panel 106 to protect the display panel 106 from external impacts.

As shown in FIG. 28, the bottom portion 502 of the bottom chassis 500 is partially recessed with respect to the light guide plate 220. A starting point of the recess of the bottom portion 502 is closer to the center portion of the light guide plate 220 than the starting point of the first flat surface 226a. In addition, the recessed depth of the bottom portion 502 is related to the difference between the first and second thicknesses t1 and t2 (shown in FIG. 14) of the light guide plate 220.

Due to the recession of the bottom portion 502, a component receiving space 550 is created in the rear surface of the bottom chassis 500. A component, e.g., a battery 600, may be accommodated in the component receiving space 550.

Thus, an additional component, such as the battery 600, may not increase a total thickness of the display apparatus 1000.

Figure 29:
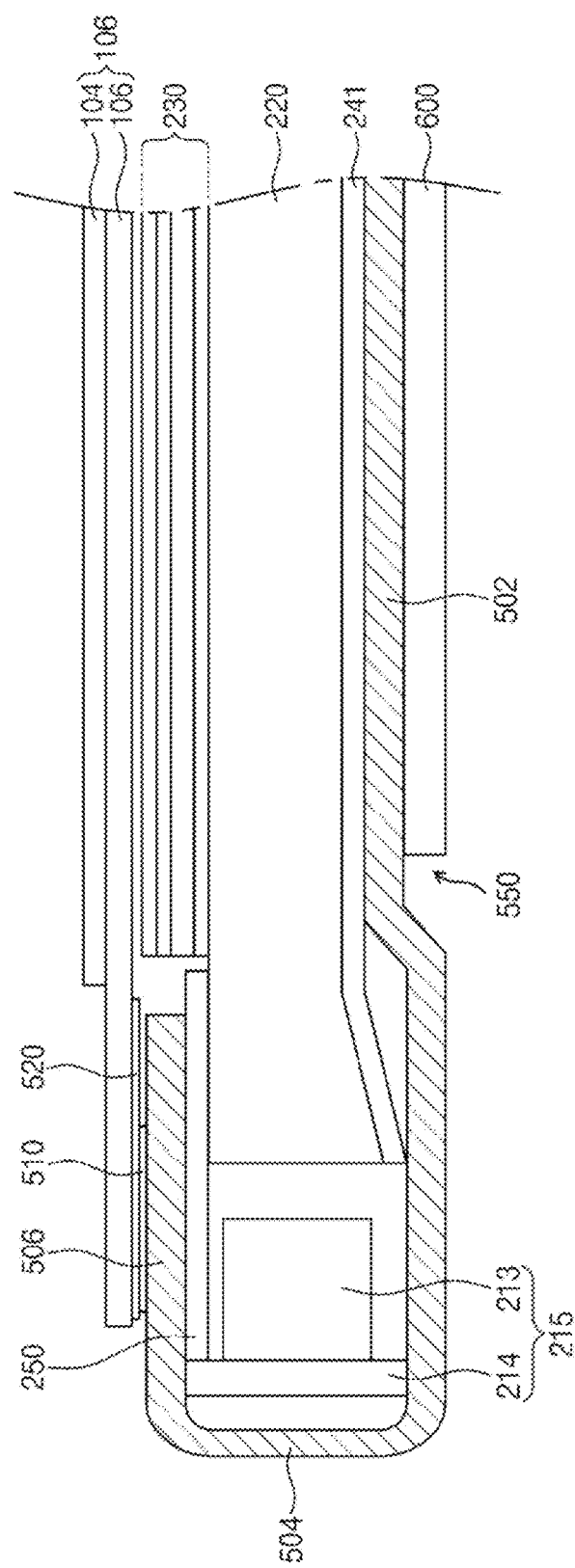
FIG. 29 is a cross-sectional view of a display apparatus according to another exemplary embodiment of the present disclosure.

FIG. 29 is a cross-sectional view of a display apparatus according to another exemplary embodiment of the present disclosure. In FIG. 29, the same reference numerals denote the same elements in FIGS. 1 to 28, and thus detailed descriptions of the same elements will be omitted.

Referring to FIG. 29, the backlight unit 200 is accommodated on the bottom portion 502 of the bottom chassis 500. A light source part 215 is accommodated in a receiving space defined by the bottom portion 502, the sidewall 504, and the cover portion 506.

According to a present exemplary embodiment, the light source part 215 includes a support substrate 214 and a plurality of light emitting diodes 213 mounted on the support substrate 214. The support substrate 214 is disposed such that a surface thereof on which the light emitting diodes 213 are mounted is substantially parallel to the incident surface 223 of the light guide plate 220.

The light guide plate 220 is accommodated in the bottom chassis 500 such that the incident surface 223 of the light guide plate 220 is disposed adjacent to the light source part 215. The reflection plate 241 is disposed between the light guide plate 220 and the bottom portion 502.

The reflection plate 241 is disposed under the first flat surface 226a, the inclined surface 226b, and the second flat surface 226c of the light guide plate 220. Accordingly, the reflection plate 241 reflects light leaking through the first flat surface 226a, the inclined surface 226b, and the second flat surface 226c.

As shown in FIG. 29, the bottom portion 502 of the bottom chassis 500 is partially recessed with respect to the light guide plate 220, and thus the component receiving space 550 is created in the rear surface of the bottom chassis 500. A component, e.g., a battery 600, may be accommodated in the component receiving space 550. Thus, an additional component, such as the battery 600, may not increase a total thickness of the display apparatus 1000.

Figure 30:
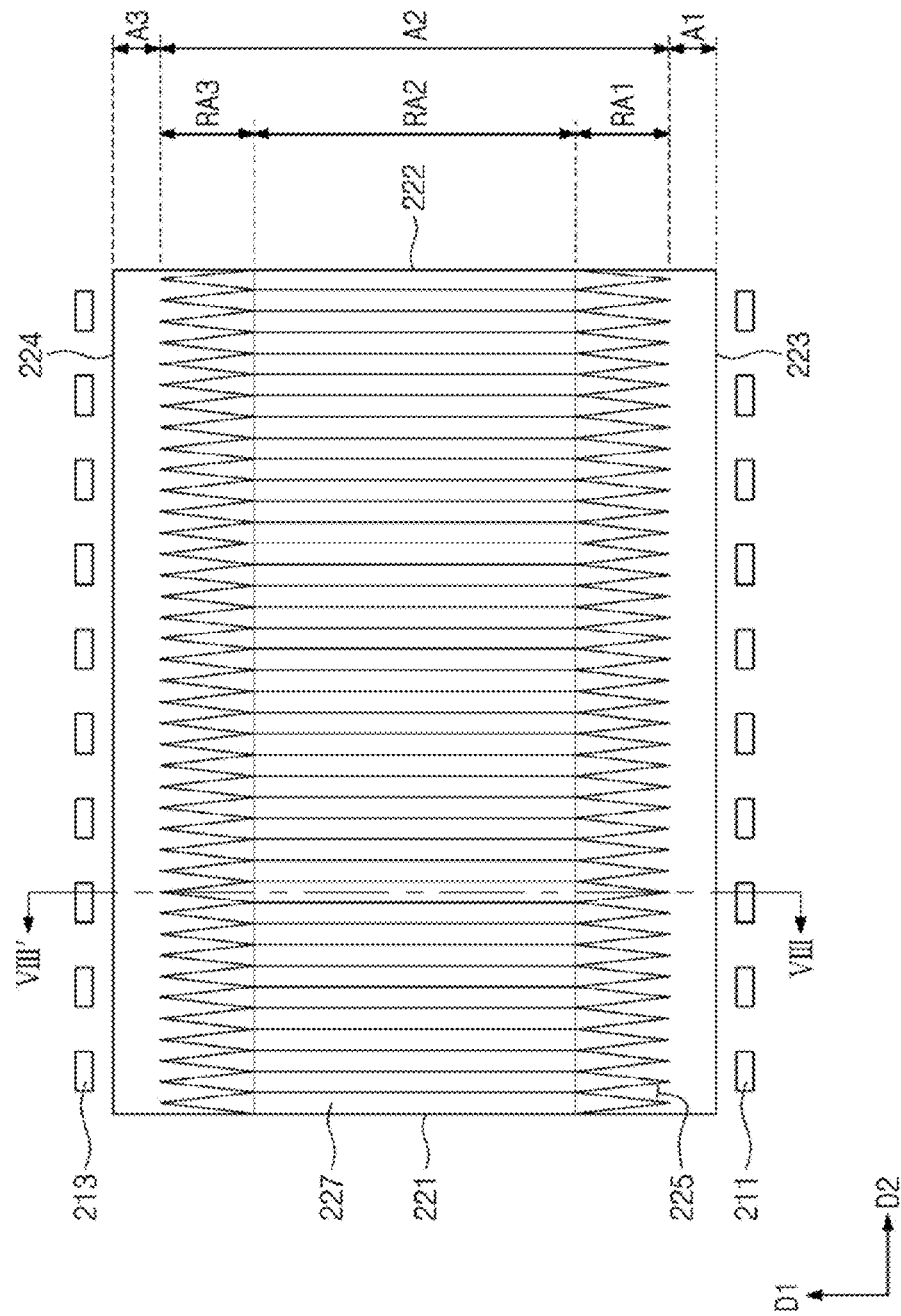
FIG. 30 is a plan view of a backlight unit according to another exemplary embodiment of the present disclosure.
Figure 31:
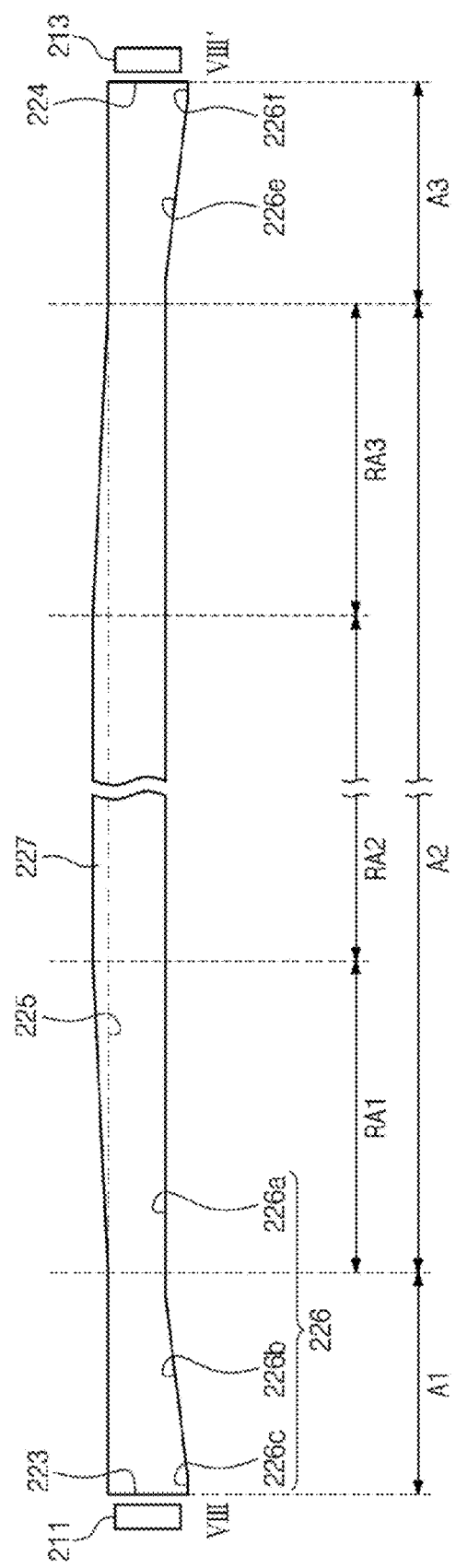
FIG. 31 is a cross-sectional view taken along a line VIII-VIII' shown in FIG. 30.

FIG. 30 is a plan view of a backlight unit according to another exemplary embodiment of the present disclosure and FIG. 31 is a cross-sectional view taken along a line VIII-VIII' shown in FIG. 30.

Referring to FIGS. 30 and 31, a backlight unit according to another exemplary embodiment includes a plurality of first light emitting diodes 211 disposed adjacent to the third side surface 223 of the light guide plate 220 and a plurality of second light emitting diodes 213 disposed adjacent to the fourth side surface 224 of the light guide plate 220. In a present exemplary embodiment, the third side surface 223 may be referred to as a first incident surface and the fourth side surface 224 may be referred to as a second incident surface.

The exit surface 225 of the light guide plate 220 is divided into a first area A1, a second area A2, and a third area A3, which are sequentially arranged from the first incident surface 223 to the second incident surface 224. The second area A2 includes a first lenticular area RA1, a second lenticular area RA2, and a third lenticular area RA3.

The first lenticular area RA1 is adjacent to the first area A1, the third lenticular area RA3 is adjacent to the third area RA3, and the second lenticular area RA2 is positioned between the first and third lenticular areas RA1 and RA3.

The light guide plate 220 includes protrusions 227 formed in the second area A2. In detail, there are no protrusions 227 in the first and third areas A1 and A3.

For example, the protrusions 227 have a semi-circular conical shape in the first and third lenticular areas RA1 and RA3 and a semi-circular cylindrical shape in the second lenticular area RA2.

That is, the height and diameters of the protrusions 227 increase in the first lenticular area RA1 with increasing distance from the first incident surface 223. In addition, the height and diameters of the protrusions 227 increase in the third lenticular area RA3 with increasing distance from the second incident surface 224.

In a present exemplary embodiment, the shape and size of the protrusions 227 are the same as those of the protrusion portions 227 described with reference to FIGS. 1 to 28, and thus details thereof will be omitted to avoid redundancy.

According to a present exemplary embodiment, a reflection surface 226 of the light guide plate 220 includes a first flat surface 226a substantially parallel to the exit surface 225, a first inclined surface 226b proximal to the first incident surface 223 that extends from the first flat surface 226a toward the first incident surface 223 and is inclined with respect to the exit surface 225, a second flat surface 226c connecting the first inclined surface 226b and the first incident surface 223, a second inclined surface 226e proximal to the second incident surface 224 that extends from the first flat surface 226a toward the second incident surface 224 and is inclined to the exit surface 225, and a third flat surface 226f connecting the second inclined surface 226e and the second incident surface 224.

The inclination of the first inclined surface 226b is such that a distance of the first inclined surface 226b from the exit surface 225 increases as the first inclined surface 226b comes closer to the first incident surface 223. The second flat surface 226c is disposed between the first inclined surface 226b and the incident surface 223 and is substantially in parallel to the exit surface 225.

The inclination of the second inclined surface 226e is such that a distance of the second inclined surface 226e from the exit surface 225 increases as the second inclined surface 226b comes closer to the second incident surface 224. The third flat surface 226f is disposed between the second inclined surface 226e and the second incident surface 224 and is substantially in parallel to the exit surface 225.

The first and second inclined surfaces 226b and 226e have a shape similar to that of the inclined surface 226b as described above, and thus details thereof will be omitted to avoid redundancy.

Although the exemplary embodiments of the present disclosure have been described, it is understood that the present disclosure should not be limited to these exemplary embodiments but various changes and modifications can be made by one ordinary skill in the art within the spirit and scope of the present disclosure as hereinafter claimed.

What is claimed is:
1. A backlight unit comprising:
  a light source that emits light; and
  a light guide plate that includes
    an incident surface to which light is incident,
    an exit surface from which light incident through the incident surface exits,
    a reflection surface facing the exit surface to reflect incident light, and
    a plurality of lenticular protrusions disposed on the exit surface,
  wherein the reflection surface comprises an inclined surface proximal to the incident surface and inclined with respect to the exit surface,
  wherein the exit surface is divided into a first area and a second area, which are sequentially arranged from the incident surface, and the plurality of lenticular protrusions are disposed in the second area, wherein the second area comprises a first lenticular area in which each lenticular protrusion has height and diameter that increase with increasing distance from the first area of the exit surface, and a second lenticular area in which each lenticular protrusion has a constant height and a constant diameter, wherein the reflection surface further comprises:

a first flat surface disposed opposite to the first and second lenticular areas and parallel to the exit surface; and a second flat surface disposed opposite to the first area which connects the inclined surface to the incident surface, wherein the inclined surface is disposed opposite to the first area.

2. The backlight unit of claim 1, wherein each lenticular protrusion in the first lentucular area has a semi-circular conical shape and extends in a first direction perpendicular to a longitudinal direction of the incident surface, and each lenticular protrusion in the second lenticular area has a semi-circular cylindrical shape and extends in the first direction perpendicular to the longitudinal direction of the incident surface.

3. The backlight unit of claim 2, wherein the lenticular protrusion in the first lenticular area is connected with the lenticular protrusion in the second lenticular area.

4. The backlight unit of claim 3, wherein a height to diameter ratio of each protrusion is the same in the first lenticular area and second lenticular area.

5. The backlight unit of claim 1, wherein an inclination of the inclined surface is such that a distance of the inclined surface from the exit surface increases as the inclined surface comes closer to the incident surface.

6. The backlight unit of claim 5, wherein the second flat surface is substantially parallel to the exit surface.

7. The backlight unit of claim 5, wherein the light guide plate further comprises a reflection pattern disposed on the reflection surface to reflect light incident through the incident surface to the exit surface.

8. The backlight unit of claim 7, wherein the light source comprises a plurality of light emitting diodes arranged in the longitudinal direction of the incident surface, and the reflection pattern in a sub-area of the second area between two adjacent light emitting diodes has a lower density than a the reflection pattern in a sub-area of the second area corresponding to the light emitting diodes.

9. The backlight unit of claim 1, further comprising a reflection plate disposed under the reflection surface to reflect light leaking from the reflection surface to the exit surface.

10. The backlight unit of claim 9, wherein the reflection plate includes a flat plate portion substantially parallel to the exit surface.

11. The backlight unit of claim 10, wherein the light guide plate further comprises a dispersion agent distributed in the inclined surface.

12. The backlight unit of claim 10, wherein the reflection plate includes an inclined portion disposed under the inclined surface.

13. A display apparatus comprising:
a display unit that displays an image;
a backlight unit that provides light to the display unit; and
a receiving container that accommodates the backlight unit, the backlight unit comprising:
a light source that emits light; and
a light guide plate that includes
an incident surface to which light is incident,
an exit surface from which light incident through the incident surface exits,
a reflection surface facing the exit surface to reflect the incident light, and
a plurality of lenticular protrusions disposed on the exit surface, wherein the reflection surface comprises an inclined surface proximal to the incident surface and inclined to the exit surface, wherein the exit surface is divided into a first area and a second area, which are sequentially arranged from the incident surface, and the plurality of lenticular protrusions are disposed in the second area, wherein the second area comprises a first lenticular area in which each lenticular protrusion has height and diameter that increase with increasing distance from the first area of the exit surface, and a second lenticular area in which each lenticular protrusion has a constant height and a constant diameter, wherein the reflection surface further comprises:

a first flat surface disposed opposite to the first and second lenticular areas and parallel to the exit surface; and a second flat surface disposed opposite to the first area which connects the inclined surface to the incident surface, the inclined surface is disposed opposite to the first area.

14. The display apparatus of claim 13, wherein each lenticular protrusion in the first lentucular area has a semi-circular conical shape and extends in a first direction perpendicular to a longitudinal direction of the incident surface, and each lenticular protrusion in the second lenticular area has a semi-circular cylindrical shape and extends in the first direction perpendicular to the longitudinal direction of the incident surface.

15. The display apparatus of claim 14, wherein an inclination of the inclined surface is such that a distance of the inclined surface from the exit surface increases as the inclined surface comes closer to the incident surface.

16. The display apparatus of claim 15, wherein the light guide plate further comprises a reflection pattern disposed on the reflection surface to reflect light incident through the incident surface to the exit surface.

17. The display apparatus of claim 16, wherein the light source comprises a plurality of light emitting diodes arranged in a longitudinal direction of the incident surface, and the reflection pattern in a sub-area of the second area between two adjacent light emitting diodes has a lower density than a the reflection pattern in a sub-area of the second area corresponding to the light emitting diodes.

18. The display apparatus of claim 13, further comprising a reflection plate disposed under the reflection surface to reflect light leaking through the reflection surface to the exit surface.

19. The display apparatus of claim 18, wherein the reflection plate has a flat plate shape substantially parallel to the exit surface, and the light guide plate further comprises a dispersion agent distributed in the inclined surface.

20. The display apparatus of claim 13, wherein the receiving container comprises:
a bottom portion on which the backlight unit is mounted;
a sidewall that extends from the bottom portion; and
a cover portion that extends from the sidewall to be substantially parallel to the bottom portion to cover the light source.

21. The display apparatus of claim 20, wherein the bottom portion of the bottom chassis is partially recessed to the light guide plate to provide a component receiving space in association with a rear surface of the bottom chassis.

22. A backlight unit comprising:
- a light guide plate that includes a first incident surface onto which light is incident, an exit surface from which light incident through the first incident surface exits, a reflection surface facing the exit surface to reflect incident light; and
- a light source adjacent to the first incident surface,
- wherein the exit surface includes a first area proximal to the first incident surface and a second area adjacent to the first area upon which a plurality of lenticular protrusions are disposed that extend in a first direction perpendicular to a longitudinal direction of the first incident surface,
- wherein the second area comprises a first lenticular area in which each lenticular protrusion has a semi-circular conical shape and a second lenticular area in which each lenticular protrusion has a semi-circular cylindrical shape,
- wherein the reflection surface further comprises:
  - a first flat surface disposed opposite to the first and second lenticular areas and parallel to the exit surface;
  - an inclined surface disposed opposite to the first area; and
  - a second flat surface disposed opposite to the first area which connects the inclined surface to the first incident surface.

23. The backlight unit of claim 22, wherein a height and a diameter of each lenticular protrusion in the first lenticular area increase with increasing distance from the first area of the exit surface, and each protrusion portion has a constant height and a constant diameter in the second lenticular area.

24. The backlight unit of claim 23, the protrusion in the first lenticular area is connected with the protrusion in the second lenticular area.

25. The backlight unit of claim 22, wherein the light guide plate further comprises a second incident surface opposite the first incident surface, the exit surface further includes a third area between the second area and the second incident surface, and the second area further includes a third lenticular area adjacent the third area, wherein a height and a diameter of each lenticular protrusion in the third lenticular area increase with increasing distance from the third area of the exit surface.

26. The backlight unit of claim 22, wherein an inclination of the first inclined surface is such that a distance of the first inclined surface from the exit surface increases as the first inclined surface comes closer to the first incident surface.

27. The backlight unit of claim 26, wherein the second flat surface is substantially parallel to the exit surface.

28. The backlight unit of claim 26, wherein the light guide plate further comprises a second incident surface opposite the first incident surface, and the reflection surface further comprises a third flat surface adjacent to the second incident surface, and a second inclined surface between the first flat surface and the third flat surface, wherein an inclination of the second inclined surface is such that a distance of the second inclined surface from the exit surface increases as the second inclined surface comes closer to the second incident surface.

29. The backlight unit of claim 22, further comprising:
- a reflection pattern disposed on the reflection surface to reflect light incident through the first incident surface to the exit surface, wherein the reflection pattern in a sub-area of the second area between two adjacent light emitting diodes has a lower density than a the reflection pattern in a sub-area of the second area corresponding to the light emitting diodes,
- wherein the light source is adjacent to the to the first incident surface of the light guide plate and includes a plurality of plurality of light emitting diodes arranged in the longitudinal direction of the first incident surface.

* * * * *